(12) United States Patent
Gooding et al.

(10) Patent No.: US 9,400,880 B2
(45) Date of Patent: Jul. 26, 2016

(54) METHOD AND APPARATUS FOR BIOMETRIC-BASED SECURITY USING CAPACITIVE PROFILES

(71) Applicant: QUALCOMM Incorporated, San Diego, CA (US)

(72) Inventors: Ted Ray Gooding, San Diego, CA (US); Robert Scott Tartz, San Marcos, CA (US); Aniket Vartak, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/328,575

(22) Filed: Jul. 10, 2014

(65) Prior Publication Data

US 2015/0363585 A1  Dec. 17, 2015

Related U.S. Application Data

(60) Provisional application No. 62/013,496, filed on Jun. 17, 2014.

(51) Int. Cl.
*G06F 7/04* (2006.01)
*G06F 21/32* (2013.01)
*G06F 17/24* (2006.01)
*H04L 29/08* (2006.01)
*G06K 9/00* (2006.01)
*G06F 3/0488* (2013.01)

(52) U.S. Cl.
CPC .......... *G06F 21/32* (2013.01); *G06F 3/04883* (2013.01); *G06F 17/248* (2013.01); *G06K 9/0002* (2013.01); *G06K 9/00026* (2013.01); *G06K 9/00087* (2013.01); *G06K 9/00382* (2013.01); *H04L 67/303* (2013.01)

(58) Field of Classification Search
CPC ..... G06F 21/32; G06F 17/248; H04L 67/303; H04L 63/0861
USPC .................................. 726/19; 382/115, 124
See application file for complete search history.

(56) References Cited

U.S. PATENT DOCUMENTS

| | | | |
|---|---|---|---|
| 5,825,352 A | 10/1998 | Bisset et al. | |
| 6,714,666 B1 | 3/2004 | Morimura et al. | |
| 7,082,213 B2 | 7/2006 | Black | |
| 7,181,052 B2 | 2/2007 | Fujieda | |
| 7,356,169 B2 | 4/2008 | Hamid | |

(Continued)

OTHER PUBLICATIONS

International Search Report and Written Opinion—PCT/US2015/035585—ISA/EPO—Aug. 28, 2015.

*Primary Examiner* — Hadi Armouche
*Assistant Examiner* — Angela Holmes
(74) *Attorney, Agent, or Firm* — Loza & Loza LLP

(57) ABSTRACT

A biometric security method and apparatus for a capacitive sensor system is provided herein, where the method may include capturing a set of raw capacitive frames for a body part via the capacitive sensor system, wherein each raw capacitive frame includes a distribution of a plurality of capacitance levels measured from the body part; creating a capacitive profile based on the set of raw capacitive frames; comparing a first value in the capacitive profile to a second value in a biometric template generated from an enrolled body part, wherein the first value and the second value are located at a similar location with respect to the capacitive profile; and, generating an authentication signal based on a difference between the first value and the second value.

26 Claims, 15 Drawing Sheets

(56) References Cited

U.S. PATENT DOCUMENTS

| | | |
|---|---|---|
| 7,415,139 B2 | 8/2008 | Takiguchi |
| 8,380,995 B1 | 2/2013 | Paul |
| 2003/0007670 A1* | 1/2003 | Hamid .......................... 382/124 |
| 2007/0116330 A1* | 5/2007 | Takiguchi ..................... 382/115 |
| 2007/0198850 A1* | 8/2007 | Martin et al. ................. 713/186 |
| 2011/0115604 A1 | 5/2011 | Sobel et al. |
| 2012/0110662 A1 | 5/2012 | Brosnan et al. |
| 2012/0174213 A1 | 7/2012 | Geiger et al. |

\* cited by examiner

METHOD AND APPARATUS FOR BIOMETRIC-BASED SECURITY USING CAPACITIVE PROFILES

CROSS-REFERENCE TO RELATED APPLICATIONS

This application claims priority to and the benefit of provisional patent application No. 62/013,496 filed in the United States Patent and Trademark Office on Jun. 17, 2014, the entire content of which is incorporated herein by reference.

BACKGROUND

1. Field

Aspects of the present disclosure relate generally to touch sensor systems, and more particularly, to a method and apparatus for biometric-based security using capacitive profiles.

2. Background

Biometrics-based security offers convenience for users because there is nothing to be remembered and nothing to lose. Thus, a user may be authenticated or identified based on one or more biometrics belonging to the user. For example, a biometric authentication approach utilizes physical characteristics of a user's anatomy, such as handprints or fingerprints, for authenticating the user. As another example, a biometric authentication approach utilizes face recognition and voice recognition systems for authentication the user. The approaches provided in the latter example are convenient because they do not depend on the user physically touching the security system for identification. However, they are extremely susceptible to environmental parameters in which these systems operate, including insufficient lighting or excessive background noise. Further, for an audio-based biometric security system such as the aforementioned voice recognition system, limitations on deployment may include quiet environments that are optimized for capturing a user's voice clearly, but ironically that are intolerant of audio disturbances. These include such environments as occupied movie theaters, conference rooms, classrooms, and libraries. Many of these aforementioned issues are exacerbated for biometric security systems utilizing mobile devices because there is often very little predictability of or control over the environments in which mobile devices will operate.

Examples of biometric sensing schemes that are typically used for biometric security systems on mobile devices include physical sensing schemes and optical read schemes. In an optically based read scheme, a picture of a body part is captured as optical image data using mainly light reflection and an image sensor. In contrast, in a physically based sensing scheme, effects of a body part on sensors such as capacitive sensors are determined Typically, these sensors are formed into an array, with a sensing resolution that depends on how densely the sensors need to be packed in the array. For example, fingerprint authentication is commonly used as a biometric authentication method, but users may not accept this approach because of its association with criminality and privacy concerns, such as where a governmental database could be linked to identify the fingerprints. In addition, the fingerprint authentication approach typically involves increased hardware implementation costs due to a need to employ high-resolution sensors to be able to accurately read fingerprints. These high-resolution sensors are typically separated from other touch-sensing devices such as touchscreens. The "Touch ID" fingerprint authentication system used in the iPhone® 5s from Apple, Inc. and the "Fingerprint Scanner" fingerprint authentication system used in the Galaxy® S5 from Samsung Electronics Co., Ltd. are examples of these high-resolution sensors.

In contrast to specialized sensor devices such as the aforementioned fingerprint sensors, touchscreens are commonly found in a variety of devices in today's industrial and consumer markets including such devices as cellular phones, global positioning (GPS) devices, set-top boxes, still and video cameras, computer screens, digital audio players, digital tablets, and the like. Because of their ubiquity and widespread implementation, touchscreens may be utilized to create biometric authentication systems that may be less costly and complex to implement as compared to those using specialized, high-resolution types of sensors such as, for example, fingerprint sensors. In many instances, biometric security systems that utilize touchscreens would not require additional hardware.

For example, one type of touchscreen-based biometric system that is generally referred to as a behavioral biometric system uses touchscreen behavior to verify users from common touchscreen gestures, such as scroll, pinch and tap. Some behavioral biometric systems have extended this further to use parameters such as dwell-time and touch pressure to enhance user authentication. However, behavioral biometric systems are time-based in that, inherently, they can only provide authentication of a user after the user has utilized the system for a required period of time. Further, behavioral biometric systems are generally not as accurate as another type of touchscreen-based biometric system referred to generally as a physical biometric system that utilizes physical biometric characteristics to verify users system.

It would be desirable for a biometrics-based security solution to be low cost, offer convenience, provide accuracy, and utilize existing hardware while offering simple user interaction.

SUMMARY

The following presents a simplified summary of one or more aspects of the disclosed approach, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects for providing biometric-based security using capacitive profiles are disclosed herein. In accordance with one aspect of the disclosed approach, a biometric security apparatus may be provided that includes a capacitive sensor system configured to capture a set of raw capacitive frames for a body part, wherein each raw capacitive frame includes a distribution of a plurality of capacitance levels measured from the body part; means for creating a capacitive profile based on the set of raw capacitive frames; and, a processing system. The processing system may be configured to compare a first value in the capacitive profile to a second value in a biometric template generated from an enrolled body part, wherein the first value and the second value are located at a similar location with respect to the capacitive profile; and generate an authentication signal based on a difference between the first value and the second value.

In accordance with another aspect of the disclosed approach, a biometric security apparatus is provided that includes a capacitive sensor system configured to capture a set of raw capacitive frames for a body part, wherein each raw capacitive frame includes a distribution of a plurality of capacitance levels measured from the body part; and, a processor coupled to the capacitive sensor system to receive the set of raw capacitive frames. The processor is configured to create a capacitive profile based on the set of raw capacitive frames; compare a first value in the capacitive profile to a second value in a biometric template generated from an enrolled body part, wherein the first value and the second value are located at a similar location with respect to the capacitive profile; and, generate an authentication signal based on a difference between the first value and the second value.

In accordance with yet another aspect of the disclosed approach, a biometric security method for a capacitive sensor system is provided that may include capturing a set of raw capacitive frames for a body part via the capacitive sensor system, wherein each raw capacitive frame includes a distribution of a plurality of capacitance levels measured from the body part; creating a capacitive profile based on the set of raw capacitive frames; comparing a first value in the capacitive profile to a second value in a biometric template generated from an enrolled body part, wherein the first value and the second value are located at a similar location with respect to the capacitive profile; and, generating an authentication signal based on a difference between the first value and the second value.

In accordance with yet another aspect of the disclosed approach, a computer program product may be provided that includes non-transitory computer-readable medium having instructions executable by a biometric security system to capture a set of raw capacitive frames for a body part via a capacitive sensor system, wherein each raw capacitive frame includes a distribution of a plurality of capacitance levels measured from the body part; create a capacitive profile based on the set of raw capacitive frames; compare a first value in the capacitive profile to a second value in a biometric template generated from an enrolled body part, wherein the first value and the second value are located at a similar location with respect to the capacitive profile; and, generate an authentication signal based on a difference between the first value and the second value.

These and other aspects of the disclosed approach will become more fully understood upon a review of the detailed description, which follows.

BRIEF DESCRIPTION OF THE DRAWINGS

These and other sample aspects of the disclosure will be described in the detailed description that follow, and in the accompanying drawings.

Figure 1:
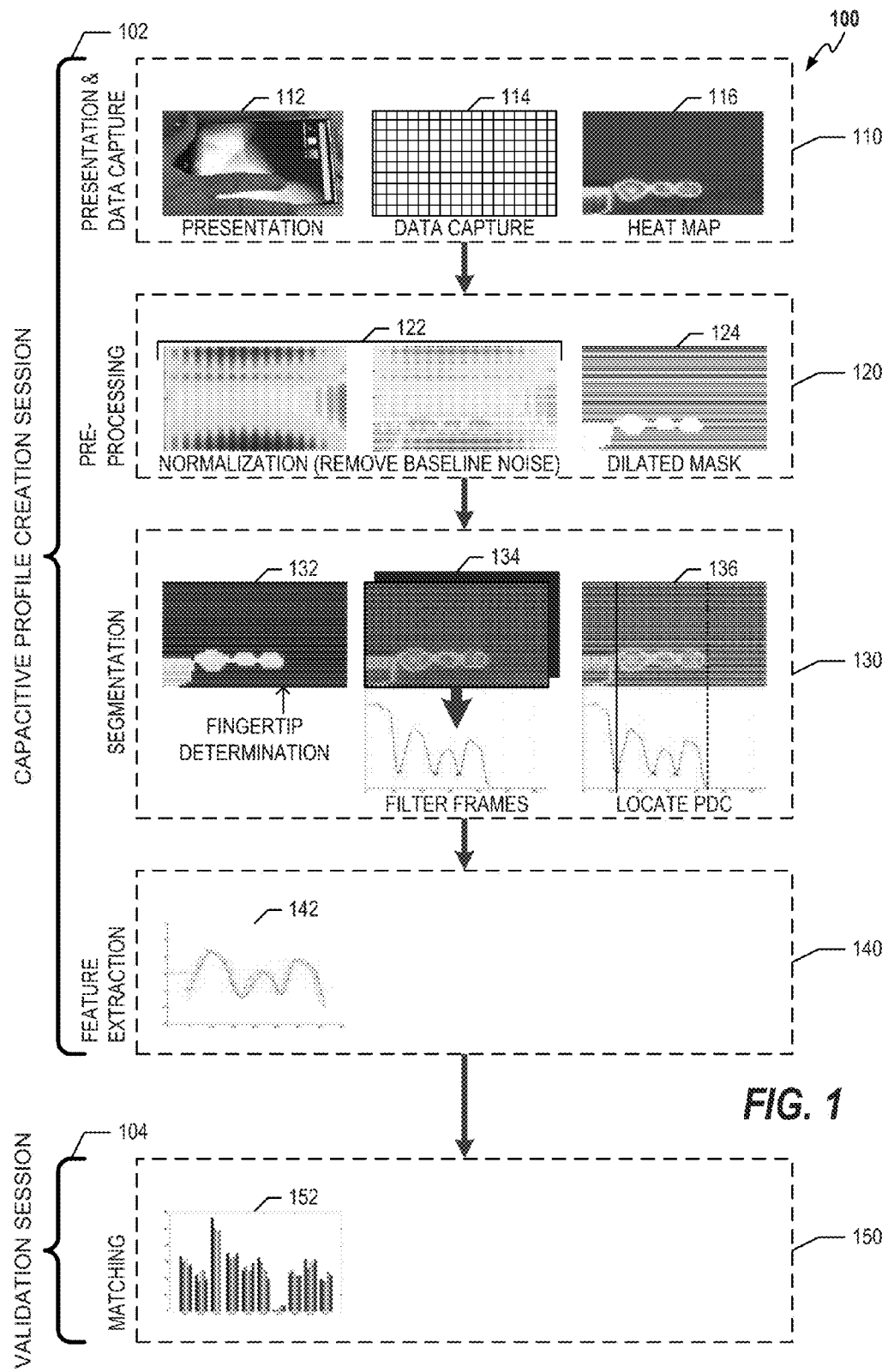
FIG. 1 is a flow diagram of a finger biometric-based security process for a biometric security system configured in accordance with various aspects of the disclosed approach for biometric-based security using capacitive profiles.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of a method and apparatus for biometric-based security using capacitive profiles as described herein are provided in a biometric security system that analyzes raw capacitance sensor data received from a capacitive sensing system affected by a part of a biological entity. As used herein, a "biological entity" may refer to any biological entity, human or otherwise, of which a part thereof, such as a body part for a human, may be used for authentication or identification. For purposes of simplifying the discussion, the term "user" may be used for the biological entity, and the term "body part" may be used to refer to the part of the biological entity that is being used for authentication or identification, as further described herein.

In one aspect of the disclosed approach, an "authentication" mode of operation may be used herein to refer to a mode of operation of the biometric security system for authenticating a user with respect to a biometric template associated with that user. It should be noted that the term "verification" and all variations thereof might be used interchangeably with the term "authentication." In another aspect of the disclosed approach, an "identification" mode of operation may be used herein to refer to a mode of operation of the biometric security system for matching a user with a single biometric template in a set of biometric templates associated with that user. In other words, a user with a known, but unconfirmed identity, also referred to herein as an "unverified user" may be verified using the authentication mode, while a user with an unknown identity, also referred to herein as an "unknown user" may be identified using the identification mode. Regardless of the distinction provided between the authentication and identification modes of operations described above, it should be understood that any reference to, or description of, various aspects of any disclosed approach for purposes of an authentication application may similarly apply to applications of the disclosed approach for purposes of an identification application. In addition, various aspects of the disclosed approach may be used in applications where either or both authentication and identification may enable access to devices, data, or software, etc.; or other applications where either or both authentication and identification may provide any benefit in terms of security or utility.

In one aspect of the disclosed approach, raw capacitance data of the body part may be obtained directly from an arrangement of capacitive sensing elements in a capacitive sensor system. Each capture of raw capacitance data from the arrangement of capacitive sensing elements, stored in and referred to as a "raw capacitive frame," contains information regarding a distribution of relative capacitance levels sensed over the arrangement of capacitive sensing elements when the body part is placed on or near enough to the capacitive sensor system to affect any capacitive sensing elements.

In one aspect of the disclosed approach, a raw capacitive frame may be analyzed both by locating which capacitive sensor element in the capacitive sensor array were affected by the body part, and also by determining a distribution of relative capacitance levels measured by those capacitive sensor element for that same body part. The analysis of each raw capacitive frame is not limited to determining such geometric measurements of the body part being analyzed. For example, the analysis of each raw capacitive frame may also provide a relative distribution of capacitance values as measured by all sensor elements during creation of the raw capacitive frame. Thus, the disclosed approach may use a combination of both the geometric measurements and the relative distribution of capacitance values in raw capacitive frames.

For example, where the body part is a hand, the analysis of each raw capacitive frame may provide gross geometric measurements of lengths and widths of fingers (including a thumb portion of the hand), separation between knuckles of each finger, and other anatomical measurements. The analysis may also utilize relative distribution of capacitance values of all sensor elements of the capacitive sensor system affected by the hand. Being able to compare the variation of the relative distribution of capacitance values across raw capacitive frames allows authentication of users without being limited to use of gross geometric measurements. Thus, raw capacitive frames may be analyzed by not only locating which capacitive sensing elements in an capacitive sensor array are affected by a body part of a user, but also by determining a relative distribution over the capacitive sensor array of how much each capacitive sensing element is affected by the body part. An analysis of which capacitive sensing elements are affected would only be able to yield simple measurements, such as lengths and widths of fingers and digits. As described herein, capacitance measurements by the array of capacitive sensors of the body part and the relative distribution thereof, which varies due to such biometric factors as skin properties and manner of contact, may be used because they are highly consistent within—yet highly unique between—subjects.

In accordance with one aspect of the disclosed approach, a capacitive profile may be created for the body part of the user based on an analysis of a set of raw capacitive frames captured for the body part. The set of raw capacitive frames may be captured as a sequential series of raw capacitive frames. The sequential series of raw capacitive frames may be processed and combined to create the capacitive profile, as further described herein.

In accordance with one aspect of the disclosed approach, a biometric template may be created for the body part of the user during a biometric enrollment process, where the biometric template may later be used to authenticate the user. In one aspect of the disclosed approach, the biometric template may be created from one or more capacitive profiles, each of which may be generated from one or more raw capacitive frames, as discussed further herein. One created, the biometric template may be used later for authentication of the user.

The arrangement of capacitive sensing elements in the capacitive sensor system may be implemented as a capacitive sensor array that includes multiple capacitive sensing elements. Each capacitive sensing element may be used to detect the presence and/or absence of a conductive object, although direct contact between the conductive object and capacitive sensing element is not necessarily required. As used herein, the terms "capacitive sensor element" and "capacitive sensing element" are both meant to refer to a sensor element capable of detecting a change of capacitance due to a body part of a biological entity being placed on or near a surface of the sensor element, where the terms "measurement," "determination," "value," and "level," when used with either terms "capacitive" or "capacitance," refers to a capacitance level sensed by the capacitive sensor element, where the capacitance level may be provided as an analog or digital form. Further, although a portion of any description contained herein may use the terms "touches," "contacts," or any other grammatical form of the terms "touch" or "contact" to refer to actual, physical contact between a body part or a biological entity with one or more capacitive sensing elements in the capacitive sensor system, such use should be understood to encompass locating the body part of the biological entity in close enough proximity to affect a capacitance level in any of the capacitive sensing elements, unless otherwise stated. In other words, unless a description specifically notes that a physical contact or touch is required with regard to capacitive sensing elements, no such limitation should be read therein.

As further described herein, capacitive sensing elements are typically constructed of a conductive pad, a surrounding ground, and a connection to a controller. In most applications, the conductive pad is a large copper footprint and the surrounding ground is a poured fill. A native (parasitic) capacitance exists between these two objects. However, when a third conductive object such as a human finger—is brought into proximity with the sensor, the capacitance of the system is increased by the capacitance of the stimulus. For example, when a body part such as a hand comes into contact or close proximity with the arrangement of capacitive sensing elements in the capacitive sensor system, a capacitance in one or more of the capacitive sensing elements changes. One or more electrical circuit may measure a value of the capacitance in each of the one or more of the capacitive sensing elements and convert these measured values of the capacitive sense elements into digital values, as further described herein.

In accordance with various aspects of the disclosed approach, the capacitive sensing system may be implemented as a part of a display device to create a capacitive touch screen, and raw data output from the capacitive touch screen may be used to generate raw capacitive frames reporting a distribution of varying capacitance levels caused by a body part of a biological entity that come in contact with or near the capacitive touch screen. To provide a better understanding of the various aspects of the disclosed approach, each raw capacitive frame may be represented in various figures contained herein as an image referred to as a "capacitive heat map image" or, more simply, as a "capacitive heat map." Each capacitive heat map may visually represent information stored in a corresponding raw capacitive frame by displaying a distribution of a plurality of capacitance levels contained in the raw capacitive frame as measured by the capacitive sensing elements of the capacitive sensor array of the capacitive sensing system. In the various capacitive heat maps that may be included in the figures, each capacitive measurement of a raw capacitive frame may be represented by a single pixel in the capacitive heat map and each level is assigned a different shade of gray as the capacitive heat map is displayed in gray scale. The capacitive heat map may also be displayed as a color image as well. It should be noted that the use of capacitive heat maps in the description associated with the various figures contained herein should not constitute a limitation of the applicability of any of the various aspects of the disclosed approach because use of any capacitive heat map should be understood to be solely for the purposes of assisting in the comprehension of the descriptive material contained herein.

It should be noted that any suitable portion of the biological entity might be used as the body part for authentication purposes. For example, in addition to fingers, hands or portions of a hand of the user, such as a portion of a palm of the hand of the user that may come into contact with the touch screen when the user is using a stylus, may also be used as the body part. Another example of body parts that may be used would be ears or portions of an ear of the user that may come into contact with the touch screen when the user has the touch screen to the ear when, for example, the user is in a phone call. Similar to the process described above for fingers and hands, capacitive profiles may be generated for these body parts to create a biometric template to later be used in performing authentication by comparing one or more capacitive profiles generated for a presented body part that may include all or a portion of the same part of the body used in the creation of the biometric template.

Figure 13:
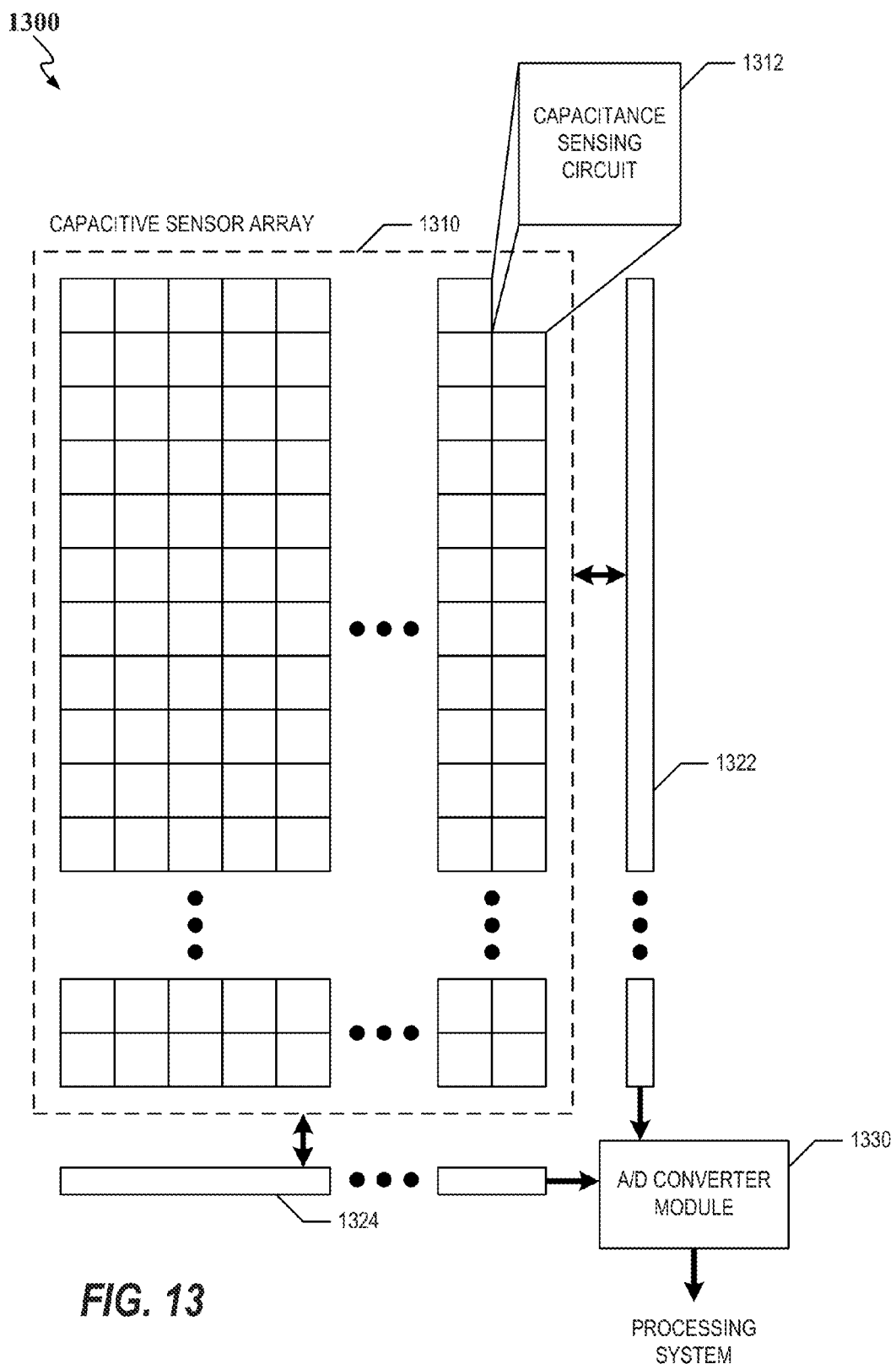
FIG. 13 is a block diagram of an exemplary capacitive sensor array configured in accordance with one aspect of the disclosed approach for biometric authentication using capacitive profiles.

FIG. 1 illustrates a finger biometric-based security process 100 configured in accordance with various aspects of the disclosed approach for biometric-based security using capacitive profiles in a biometric security system that utilizes a finger of a user as the body part for authentication. Various aspects of an operation for each portion of the finger biometric-based security process 100, which includes a presentation and data capture portion 110, a pre-processing portion 120, a segmentation portion 130, a feature extraction portion 140, and a matching portion 150, will be described herein with reference to the biometric security system including a touch screen integrating a capacitive sensor system with a capacitive sensor array, an example of which is illustrated in FIG. 13 as a capacitive sensor system 1300 that includes a capacitive sensor array 1310 that may be configured in accordance with various aspects of the disclosed approach for biometric-based security using capacitive profiles, as further explained herein.

In one aspect of the disclosed approach, a first part of the finger biometric-based security process 100, referred to and illustrated in FIG. 1 as a "capacitive profile creation session" 102 that includes the presentation and data capture portion 110, the pre-processing portion 120, the segmentation portion 130, and the feature extraction portion 140, may be used to create capacitive profiles, where each iteration of the capacitive profile creation session 102 may be used to create a single capacitive profile. As described further herein, each capacitive profile may be generated from a set of one or more captured raw capacitive frames and may be used for such purposes as: (1) establishing a biometric template for a body part such as the finger of the user, as further described herein with reference to FIG. 3; or (2) performing authentication using the biometric template, as further described herein with reference to FIG. 4.

A description of an iteration of the capacitive profile creation session 102 of the finger biometric-based security process 100 begins at the presentation and data capture portion 110, where the biometric security system requests and receives presentation by the user of a body part such as the finger during a presentation operation 112. Once the body part is presented, one or more raw capacitive frames may be captured of the body part using the capacitive sensor array 1310 in the capacitive sensor system 1300 during a data capture operation 114. In one aspect of the disclosed approach, the user may be prompted and is expected to place his finger on the touch screen for a duration of time such that the capacitive sensor array 1310, which operate at a particular frame rate, may capture a set of raw capacitive frames. As an example, the user may leave his finger on the touch screen for approximately 3-4 seconds and assuming the capacitive sensor array 1310 may operate at 120 frames/second, then approximately 360-480 frames may be captured. An example of a distribution of various levels of capacitance measured for the finger that may be captured in a frame during the data capture operation 114 of the presentation and data capture portion 110 is visually illustrated as a capacitive heat map image 116.

In one aspect of the disclosed approach for the presentation operation 112, the user may place his hand on the screen in a relaxed manner, preferably flat with all fingers of the hand touching each other. This method of hand placement, generally referred to as an unconstrained presentation modality, removes a need for any type of guiding posts or other means to ensure compliance with rigid body part positioning requirements in an approach referred to generally as a constrained presentation modality.

Although the constrained presentation modality may provide such benefits as ease of finger length gauging where, for example, the body part to be analyzed is a finger and a predetermined anchor point of the finger is assumed, there are some drawbacks as well. For example, continuing with the discussion where the body part to be analyzed is the finger, rigid body part position requirements may be difficult for some people to meet and, having a fixed nature, almost eliminates extensibility to add other fingers. Further, even though a particular position of the finger may be imposed, a position of the finger may still change for each capture. More importantly, the constrained presentation modality may be very difficult to achieve on some devices, especially where those devices have thick bezels around the touch screen, which may result in partial finger measurements.

In contrast, under the unconstrained presentation modality, users may more naturally position the body part to be analyzed, such as being able to place the finger on any part of the touch screen so that the whole length of the finger is within the touch screen—without having to worry about whether a palm portion of the hand is touching the touch screen as well. This allows full finger measurement, which may generally result in more consistent measurements. In addition, use of the unconstrained presentation modality provides extensibility of the various aspects of the disclosed approach for biometric authentication using capacitive profiles to multiple fingers, as described herein.

Once the set of raw capacitive frames are acquired during the presentation and data capture portion 110, the pre-processing portion 120 of the finger biometric-based security process 100 removes any noise or other undesirable data from the frames. In one aspect of the disclosed approach for pre-processing, a normalization operation 122 may be performed to remove noise inherent in operation of the capacitive sensor array 1310 in the capacitive sensor system 1300. This noise should be removed because it affects all captured frames as a baseline noise level of the capacitive sensor array 1310. The normalization process may include averaging data in raw capacitive frames captured from the capacitive sensor array 1310 for a short period of time where there are no objects placed on the capacitive sensor array 1310 so that the baseline noise level may be established. This baseline noise level may then be subtracted from all subsequent raw capacitive frames.

In another aspect of the disclosed approach for pre-processing, a masking operation 124 in the pre-processing portion 120 may involve creating a binary mask and identifying object contours using image dilation to create a dilated mask that may then be applied to each frame to filter out capacitive measurements that may not be of interest in the analysis. For example, the binary mask may be created for each frame by using a suitable threshold to separate touched/untouched sensors. Image dilation may then be used to enhance edges of the capacitive image of the captured body part by obtaining object contours to be masked before the dilated mask is applied to each frame to filter out the surrounding noise. Although description of various operations after the pre-processing portion 120 contained herein may refer to a processing of capacitive information associated with one or more capacitive data points, measurements, or levels from a particular frame in the set of raw capacitive frames, it should be noted that unless specifically referenced, this capacitive information preferably contains only capacitive data points, measurements, or levels that remain after the pre-processing portion 120 has removed and filtered any noise. Thus, for example, even though a particular area of a frame may have capacitive measurements with levels high enough to be included in an analysis of the frame in accordance with various aspects of the disclosed approach to create a capacitive profile, these capacitive measurements are irrelevant because they are associated with capacitive sensing elements that have not been touched but are caused by noise. Thus, these capacitive measurements should still be excluded if the particular area is not part of capacitive measurements within the dilated mask because they are not relevant to the analysis of the finger.

Continuing to refer to FIG. 1, the segmentation portion 130 of the finger biometric-based security process 100, which includes a fingertip location determination operation 132, a raw capacitive frame filtering operation 134, and a Palmar Digital Crease (PDC) identification operation 136, may be used to create a capacitive profile. During the segmentation portion 130, a Palmar Digital Crease (PDC), which is a feature of the hand where the finger meets a palm portion of the hand, is identified in the capacitive profile. Identification of the PDC allows any data associated with the palm portion of the hand in the capacitive profile to be ignored, leaving only data associated with the finger in the capacitive profile to facilitate processing of the capacitive profile for feature extraction, as later described herein. In order to facilitate the description and understanding of various operations in the segmentation portion 130, reference will be made to FIG. 2, which includes a comparison 200 of a finger capacitive profile 220 plotted in a capacitive profile chart 210 to a capacitive heat map image 250.

In one aspect of the disclosed approach for segmentation, the fingertip location determination operation 132 may locate a location of a tip of the finger using a mask such as the dilated mask created as described above during the masking operation 124 in the pre-processing portion 120. An example of a fingertip location that may be identified on the finger capacitive profile 220 by the fingertip location determination operation 132 is indicated by a dotted line 222.

In accordance with various aspects of the disclosed approach, the raw capacitive frame filtering operation 134 may be used to filter and process the set of raw capacitive frames once the fingertip location has been identified. In one aspect of the disclosed approach, a time filter may be applied to the set of raw capacitive frames by averaging touch sensor data across all frames in the set of raw capacitive frames to generate a single, time-filtered capacitive frame referred to herein as a time-filtered capacitive frame. Each capacitive data point in the time-filtered capacitive frame is thus created based on an average of all capacitive measurement values from a corresponding capacitive data point in the raw capacitive frames in the set of raw capacitive frames. Thus, continuing with the example above where the capacitive sensor system 1300 operates at 120 frames/second, an average of each capacitive data point may be determined from either 360 capacitive data points if the presentation of the finger lasted exactly 3 seconds (such that 360 raw capacitive frames were captured), or 480 capacitive data points if the presentation of the finger lasted exactly 4 seconds (such that 480 raw capacitive frames were captured), where each capacitive data point in a particular raw capacitive frame was captured by a respective capacitive sensing element in the capacitive sensor array 1310. Although in the above example it is assumed that a period of time of data capture coincides exactly with a period of time of presentation, it should be noted that the period of data capture may not coincide with the period of presentation. Further, in other aspects of the disclosed approach, the number of raw capacitive frames over which each capacitive data point is averaged may vary, and it is within an expected implementation of the disclosed approach that lower and/or upper limits may be placed on a number of raw capacitive frames to be processed and combined; regardless of the number of raw capacitive frames actually captured.

Figure 2:
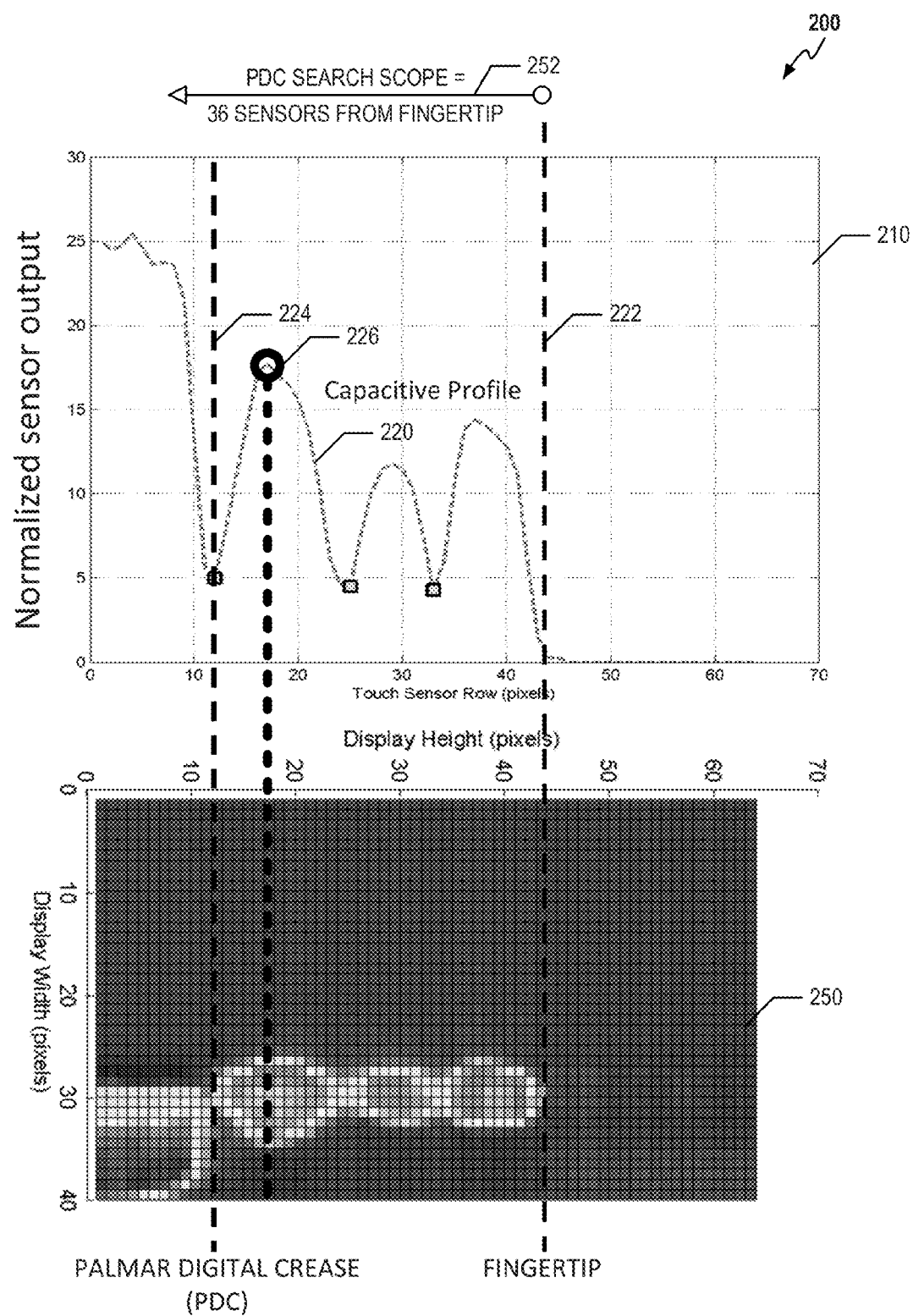
FIG. 2 is a comparison of a finger capacitive profile and associated capacitive heat map image used to visually illustrate a distribution of capacitive values in a capacitive frame captured of the finger in the biometric security system configured in accordance with other various aspects of the disclosed approach for biometric-based security using capacitive profiles.

In addition to the time filter described above, in another aspect of the disclosed approach a row filter in the raw capacitive frame filtering operation 134 may be applied to the time-filtered capacitive frame by summing all touch sensor data along each row of the time-filtered capacitive frame to create the finger capacitive profile 220. As previously noted, each capacitive heat map image is a visual representation of a distribution of various levels of capacitance measurements stored in a respective frame. In FIG. 2, the capacitive heat map image 250 is a visual representation of the distribution of various levels of capacitance measurements for the finger in the time-filtered capacitive frame generated using the time filter. In one aspect of the disclosed approach, the finger capacitive profile 220 may be generated from a summation of normalized sensor output data stored in each row of the time-filtered capacitive frame, where capacitance data from all rows of the time-filtered capacitive frame, as represented by the capacitive heat map image 250, is summed and plotted as the finger capacitive profile 220 in the capacitive profile chart 210. It should be noted that the orientation of the capacitive heat map image 250 in FIG. 2 has been rotated such that an axis representing a touchscreen display height is horizontally displaced with respect to the bottom of FIG. 2. Thus, any reference to a summation of capacitance values in each "row" of the time-filtered capacitive frame is actually a reference to a summation of capacitance values in a vertical orientation as illustrated by the capacitive heat map image 250 in FIG. 2.

The PDC identification operation 136 may be used to identify the PDC in the finger capacitive profile 220 once the row filter operation has been completed. In one aspect of the disclosed approach, a portion of the finger capacitive profile 220 with a predetermined length that is at least as long as a longest previously recorded measurement of a human index finger, which is approximately 8.5 centimeters (cm), is analyzed. This predetermined length is referred to and illustrated as a PDC search scope 252 in FIG. 2 and a geometry of the capacitive sensing elements, which is known, may be used to determine how many rows of data in the frame should be analyzed. For example, if a pitch between capacitive sensing elements is 0.24 cm, then 36 rows of data in the time-filtered capacitive frame corresponding to 36 sensors in length, where:

$$36 \text{ sensors} \times 0.24 \text{ cm/sensor} = 8.64 \text{ cm}, \quad (1)$$

may be analyzed to meet the 8.5 cm minimum required length. A valley detector may be run over the PDC search scope 252 to identify the PDC in a base portion of the finger capacitive profile 220 where a location of a border of the palm portion is expected. Referring again to the finger capacitive profile 220, a PDC for the finger is illustrated by a dotted line 224.

Once a palm portion of the capacitive profile has been identified by the segmentation portion 130, the feature extraction portion 140 of the finger biometric-based security process 100 may be used to convert the capacitive profile, such as the finger capacitive profile 220, to a z-score starting from the location of the fingertip to the PDC. The term "z-score" as used herein refers to a standard score that is a signed number of standard deviations of which an observation or datum is above a mean. In one aspect of the disclosed approach, a predetermined length is used for capacitive profile comparisons, and continuing with the example above of 36 rows in length, all fingertip capacitive profiles are aligned at the fingertip location. Then, a pad of zero values (i.e., z=0) is used to zero out the values from the location of the PDC to the origin.

In accordance with various aspects of the disclosed approach, a z-score value is dependent on such factors such as a number of sensors touched in each row; body part (e.g., finger) geometry such as, for example, length, width, area, etc.; pressure of user's presentation; capacitance level of each touched sensor; and variations in conductivity across the skin, which may or may not be due to skin moisture.

In one aspect of the disclosed approach, as further described herein, during an enrollment process an enrollment template that is created to authenticate a user may be generated from a number of capacitive profiles. For example, an exemplary number of capacitive profiles that may be averaged to create an enrollment template as used herein is three (3) capacitive profiles. However, any number of capacitive profiles may be combined, each of which is created through an operation of the capacitive profile creation session 102, which is the first part of the finger biometric-based security process 100 that includes the presentation and data capture portion 110, the pre-processing portion 120, the segmentation portion 130, and the feature extraction portion 140, as discussed above. Thus, one or more capacitive profiles, referred to as enrollment capacitive profiles, may be used to establish a biometric template for a finger of the user.

In addition, during an authentication process, one or more capacitive profiles may also be captured utilizing the capacitive profile creation session 102 previously used to capture the enrollment capacitive profiles used to generate the biometric template during the enrollment process. During a validation session 104 in a second part of the finger biometric-based security process 100, an authentication capacitive profile may be compared to the biometric template to perform authentication of the user utilizing the matching portion 150 in accordance with various other aspects of the disclosed approach, as further described herein. In other words, the first part of the finger biometric-based security process 100 that was used to create the set of enrollment capacitive profiles for establishing the biometric template may also be used to create a capacitive profile referred to as an authentication capacitive profile. The authentication capacitive profile may be compared to the biometric template using a matching operation 152 in the matching portion 150 of the finger biometric-based security process 100, as described herein.

In accordance with various aspects of the disclosed approach, during an authentication operation based on the matching operation 152, each point of the authentication capacitive profile may be compared a respective point in the biometric template using a standard matching algorithm, such as Euclidean distance, Hamming distance, etc., to evaluate if the verification data matches the biometric template at a given threshold. Thus, as used herein, the term "matched" or "matches" may refer to an authentication capacitive profile with a capacitive measurement distribution that does not have to be identical to the biometric template. If the authentication capacitive profile matches with the biometric template, then the user is authenticated, and if there is no match then authentication is denied.

Figure 3:
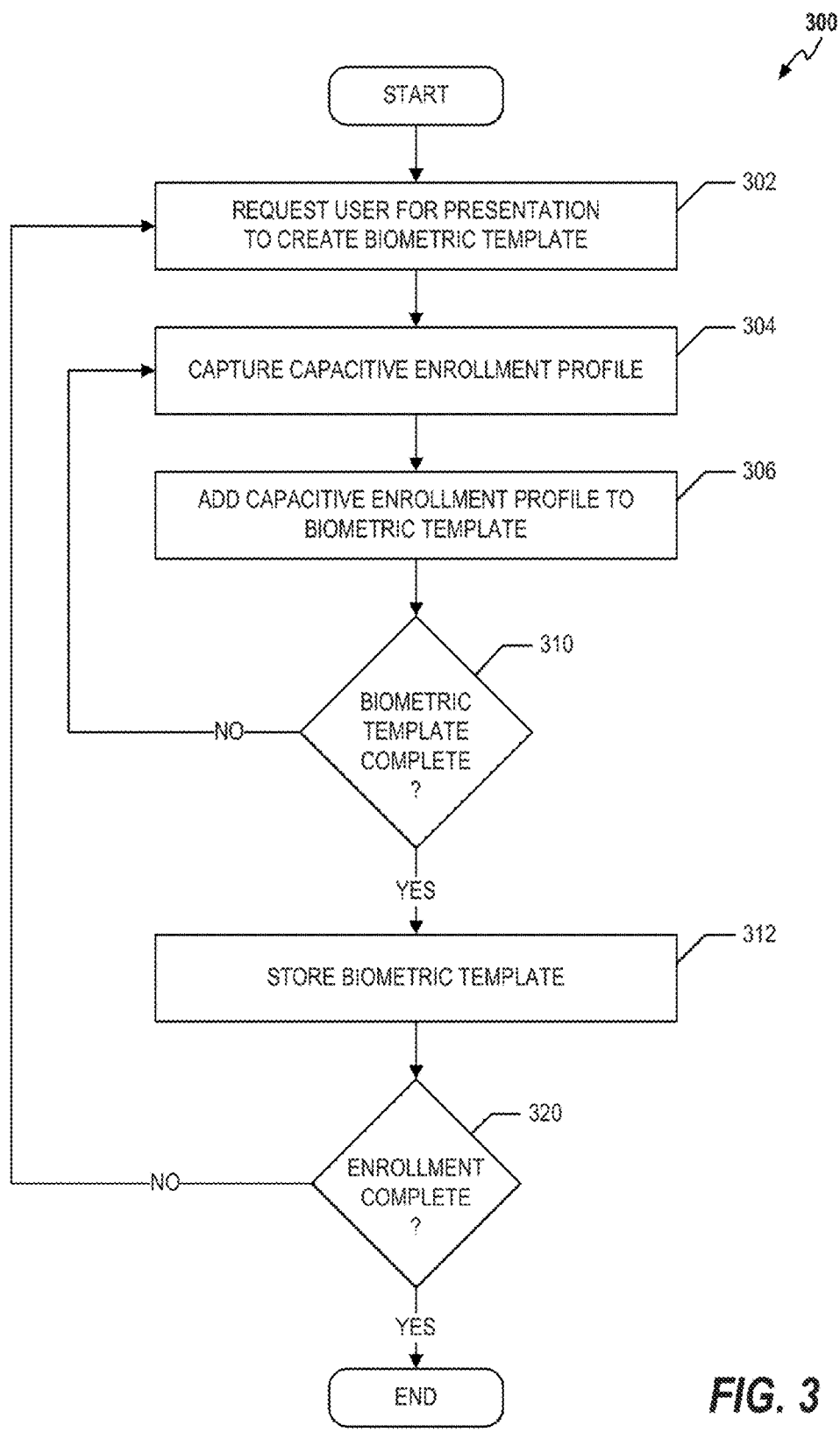
FIG. 3 is a flow diagram illustrating a biometric enrollment process in the biometric security system configured in accordance with various aspects of the disclosed approach for biometric-based security using capacitive profiles to create a biometric template.

FIG. 3 illustrates a biometric enrollment process 300 configured in accordance with various aspects of the disclosed approach for biometric-based security using capacitive profiles in a biometric security system to create a biometric template for a body part of a user. The biometric template may later be utilized to perform authentication of the user in accordance with various other aspects of the disclosed approach, as described herein. In the example described herein, the body part to be later utilized to perform authentication is a finger of the user and reference will be made to the finger biometric-based security process 100 as illustrated in FIG. 1. The biometric authentication system may include a touch screen integrating a capacitive sensor system with a capacitive sensor array, an example of which is illustrated in FIG. 13 as the capacitive sensor system 1300 that includes the capacitive sensor array 1310 that may be configured in accordance with various aspects of the disclosed approach for biometric authentication using capacitive profiles, as further explained herein.

The biometric enrollment process 300 begins at 302, where a request is made for the user to initiate creation of a biometric template through presentation of the body part. In one aspect of the disclosed approach, as the user in the example will be enrolling a finger as the body part, the operation for presentation may follow a presentation scheme as described in the presentation and data capture portion 110 of the finger biometric-based security process 100.

At 304, one or more enrollment capacitive profiles are captured. In one aspect of the disclosed approach, each enrollment capacitive profile may be generated from a respective set of raw capacitive frames as described in the finger biometric-based security process 100, where the respective set of raw capacitive frames that is used to generate the capacitive enrollment profile include a data capture of a plurality of raw capacitive frames, such as approximately 360 to 480 frames as discussed in the data capture operation of the presentation and data capture portion 110. The set of raw capacitive frames are then processed to create the capacitive enrollment profile utilizing the operations described by the pre-processing portion 120, the segmentation portion 130, and the feature extraction portion 140. Operation then continues at 306.

At 306, the capacitive enrollment profile generated by 304 is added to the biometric template. In one aspect of the disclosed approach, if more than one capacitive enrollment profile is to be added to the biometric template, then all capacitive profiles are averaged to create the biometric template that is later used for comparison during a verification process.

At 310, it is determined if the biometric template is complete. In one aspect of the disclosed approach, the biometric template may be considered complete if a sufficient number of enrollment capacitive profiles have been processed.

In one aspect of the disclosed approach, the biometric enrollment process 300 may be similar in implementation to a verification process with the exception that, during the biometric enrollment process 300, the user presents their finger (or hand) a number of times to create the set of enrollment capacitive profiles needed for the averaging capacitive profile operation to form the biometric template.

In another aspect of the disclosed approach, the biometric template may be considered complete once all relevant information related to extracting relevant profiles for a body part (e.g., a fingers) or all portions of a body part (e.g., all fingers of a hand as well as various geometries related thereto) have been extracted.

In one aspect of the disclosed approach, the operations described in the capacitive profile creation session 102, which includes the operations contained in the presentation and data capture portion 110, the pre-processing portion 120, the segmentation portion 130, and the feature extraction portion 140, may be repeated to create multiple enrollment capacitive profiles. As an example, three enrollment capacitive profiles may be used in the creation of the biometric template, with the enrollment capacitive profiles being averaged to create the biometric template, but a larger or smaller number of enrollment capacitive profiles could be used in other examples. Returning to FIG. 3, if more enrollment capacitive profiles need to be captured, operation returns to 304. Otherwise, the biometric template is stored at 312. In other words, once it is determined that the biometric template is complete, then operation will continue with 312. Otherwise, operation will return to 304, where another set of raw capacitive frames may be captured to create another enrollment capacitive profile.

At 312, the newly created biometric template may be stored. In one aspect of the disclosed approach for biometric authentication using capacitive profiles, the newly created biometric template may be stored in a storage device of the biometric system. In another aspect of the disclosed approach, the newly created biometric template may be stored in the same integrated circuit in which the touchscreen capacitive sensor array is implemented, which increases security by reducing a likelihood that a third party may have unauthorized access to biometric template. Once the newly created biometric template is stored, operations continues with 320.

At 320, it is determined if the enrollment process 300 has completed. For example, if the user wishes to enroll another body part such as another finger or the other hand, then the enrollment process 300 may be repeated. As another example, it may be possible to enroll several users through multiple iterations of the enrollment process 300—each user having a different user ID and biometric template. If the enrollment process 300 has not completed because a user desires to add more biometric templates say, for other body parts such as another finger or another hand, then operation returns to 302, where additional biometric templates may be created as discussed above. Otherwise, operation of the enrollment process 300 ends.

Figure 4:
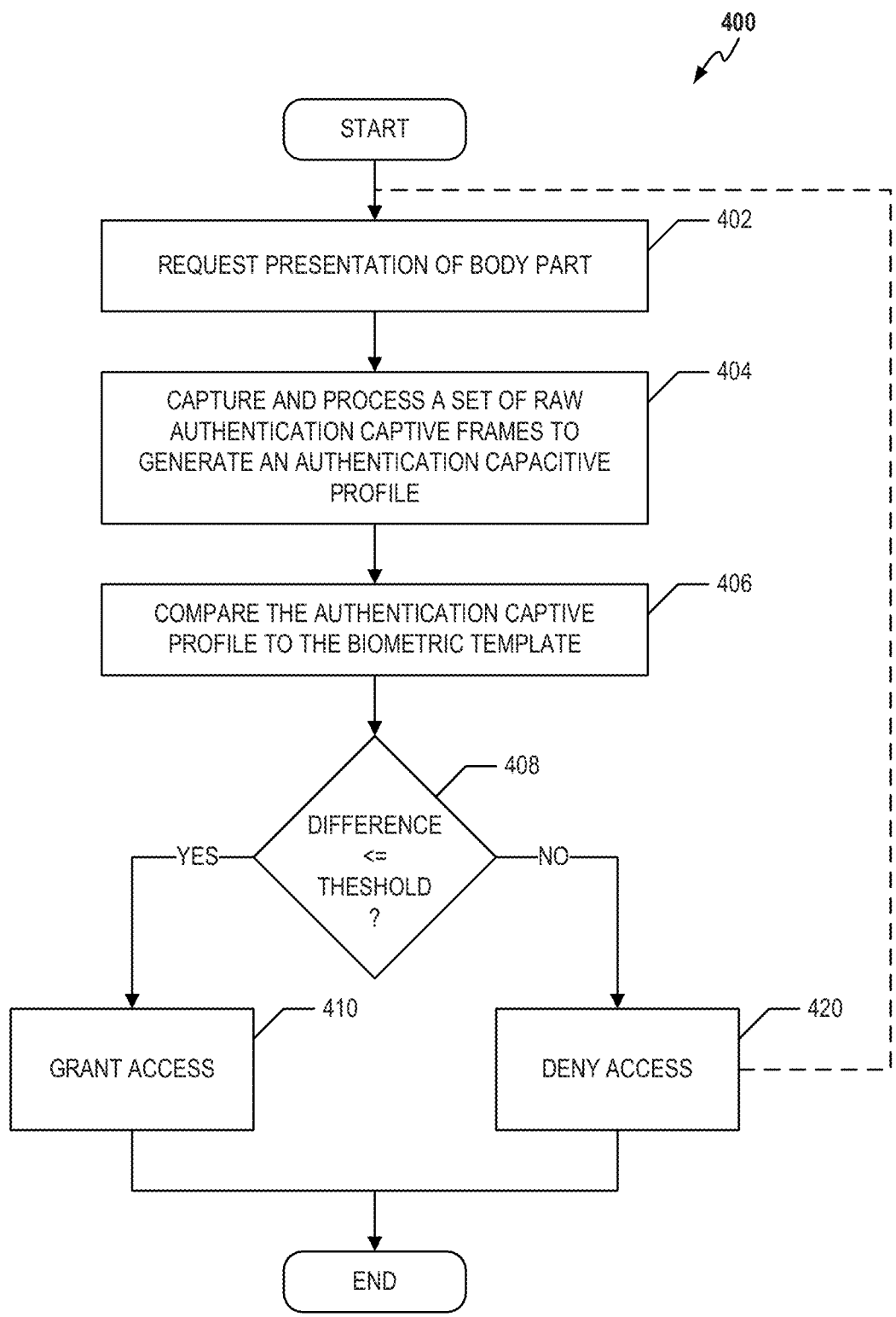
FIG. 4 is a flow diagram illustrating a biometric verification process in the biometric security system configured in accordance with various aspects of the disclosed approach for biometric authentication using capacitive profiles to authenticate or identify an unverified user.

FIG. 4 illustrates a biometric verification process 400 in the biometric security system configured in accordance with various aspects of the disclosed approach for biometric-based security using capacitive profiles that may be used to authenticate an unauthenticated user where, at 402, the unauthenticated user may be requested to present a body part for authentication. In one aspect of the disclosed approach, the biometric authentication process 400 utilizes operations from the finger biometric-based security process 100 that was used during the enrollment process 300 to create the biometric template. For example, the description in the presentation operation 112 in the presentation and data capture portion 110 of the finger biometric-based security process 100 may be applicable to 402. As discussed previously, the body part to be used for authentication should be the same body part that was enrolled in the biometric security system. For example, if a finger was enrolled during an iteration of the enrollment process 300, then request should be made for the same finger of the unauthenticated user to be presented.

At 404, a set of raw authentication capacitive frames including one or more raw capacitive frames may be captured in accordance with the operation of the data capture operation 114 in the presentation and data capture portion 110 of the finger biometric-based security process 100. The set of raw authentication capacitive frames may be processed to create an authentication capacitive profile utilizing the operations described in the pre-processing portion 120, the segmentation portion 130, and the feature extraction portion 140 of the finger biometric-based security process 100.

At 406, the authentication capacitive profile may be compared to the biometric template. In one aspect of the disclosed approach, the authentication capacitive profile may be compared to the biometric template utilizing an operation such as the matching operation 152 of the matching portion 150 from an iteration of the validation session 104. For example, a capacitive value for each location of the authentication capacitive profile may be matched with a capacitive value at a respective location of the biometric template. A difference between each pair of respective capacitive values from the authentication capacitive profile and the biometric template may be determined a tracked.

At 408, if a difference between the authentication capacitive profile as compared to the biometric template is above a predetermined threshold, referred to as an authentication threshold, which would indicate that the difference was too large and the matching operation 152 indicated that the authentication capacitive profile did not match the biometric template, then operation continues with 420. Otherwise, if the difference between the authentication capacitive profile as compared to the biometric template is below the authentication threshold, then operation may continue with 410. In accordance with various aspects of the disclosed approach, differences between particular capacitive values in the authentication capacitive profile and respective capacitive values in the biometric template may be determined and compared with the authentication threshold. In one aspect of the disclosed approach, if all the differences are below the authentication threshold then a match is signaled. In another aspect of the disclosed approach, if a sufficient number of differences are below the authentication threshold then a match is signaled.

At 410, access is granted to the user, who is now authenticated. In accordance with various aspects of the disclosed approach, granting access to the user may include providing the user with access to any systems, data, or resources protected by the biometric security system. For example, where the biometric security system is implemented as part of a touch screen of a mobile device such as a mobile phone, the user "unlock" the phone after being authenticated. In another example, if the mobile device is a table or a portable computer with one or more accounts, the user may be able to access his account after being authenticated. As discussed above, a user may be identified as well as authenticated using the biometric security system. Thus, in yet another example where the biometric security system is integrated into a computing device with multiple user accounts and a biometric template enrolled for each of at least two users—including one for the user, the biometric security system may both authenticate and login the user to his account by determining a suitable match between the authentication capacitive profile and one of the biometric templates stored by the biometric security system. In still yet another example, the computing device may be a tablet with a capacitive touch screen display that is shared among a limited number of users, each with their own access to the tablet, and the biometric security system may be implemented to allow these users to be authenticated and/or identified by measuring unique aspects of either fingers or hands of these users.

At 420, in one aspect of the disclosed approach, if there is not a match between the authentication capacitive profile and the biometric template, then operation of the biometric authentication process 400 ends. It should be noted that a match may not occur because of reasons other than the unauthenticated user not being the same user who created the biometric template using the body part. For example, the user may not have presented the body part properly during the presentation and data capture portion 110, such as by moving the body part or not properly placing the body part with respect to the capacitive sensor system 1300 during data capture. In another aspect of the disclosed approach, operation of the biometric authentication process 400 may optionally return to 402, where the unauthenticated user is requested to again present the body part for authentication.

Once it has been determined whether a match exists between the authentication capacitive profile and the biometric template, and either access is granted or denied at 410 or 420, respectively, then operation of the biometric authentication process 400 ends.

It should be noted that the generation of capacitive profiles, whether it is during a verification process or a biometric enrollment process, utilizes the same operations as described with respect to the capacitive profile creation session 102. The difference between the verification process and the biometric enrollment process involves the user presenting a body part, such as his finger or hand, only once during the verification process, and more than once during the biometric enrollment process. As discussed with respect to an example operation as described in the enrollment process 300 of FIG. 300, it is preferable that the user presents the body part at least three (3) times to generate an equal number of enrollment capacitive profiles. These three enrollment capacitive profiles are then averaged to create the biometric template that is stored for later comparison with the authentication capacitive profile created during verification process. Those skilled in the art would know that the user could be asked to presenting the body part fewer or more times during either the verification process or the biometric enrollment process, and no limitations should be read into the description based on the number of times the user needs to present the body part or on the number of capacitive profiles generated therefrom.

Figure 5:
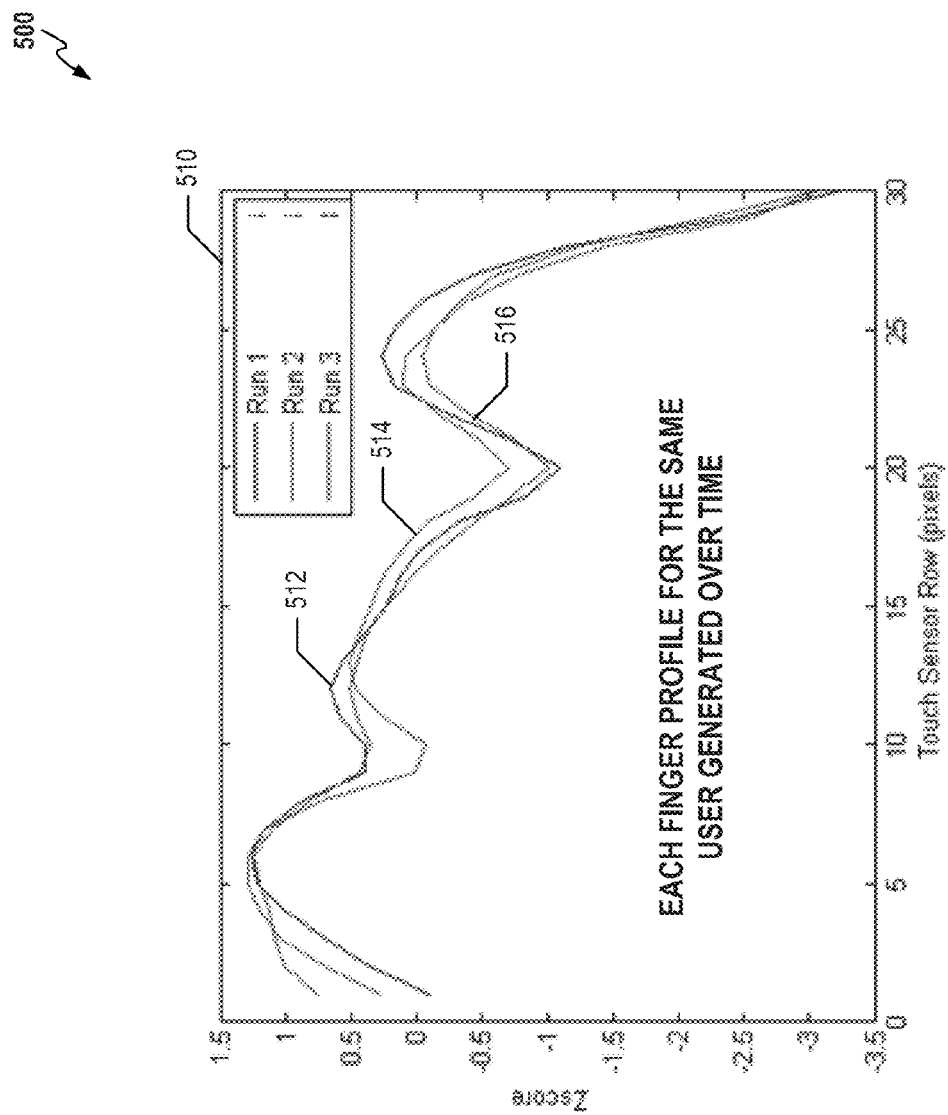
FIG. 5 is a plot of several finger capacitive profiles for a finger of a user, where each finger profile is generated for that same finger at a different period of time, which illustrates a consistency of biometric parameters for the user.

FIG. 5 illustrates a finger capacitive profile chart 500 for a collection of finger capacitive profiles 510 for a user that has been generated for a finger of the user collected over a period of time. The collection of finger capacitive profiles 500 includes finger capacitive profiles generated during different iterations of a capacitive profile creation session such as the capacitive profile creation session 102 in FIG. 1, including a finger capacitive profile generated from a first run 512, a finger capacitive profile generated from a second run 514, and a finger capacitive profile generated from a third run 516. To illustrate that capacitive profiles have excellent stability over time, creation of the collection of finger capacitive profiles 510 occurred over a two-month period on different devices used within different environments. However, it may be seen that the finger capacitive profiles created over these three runs are similar.

Figure 6:
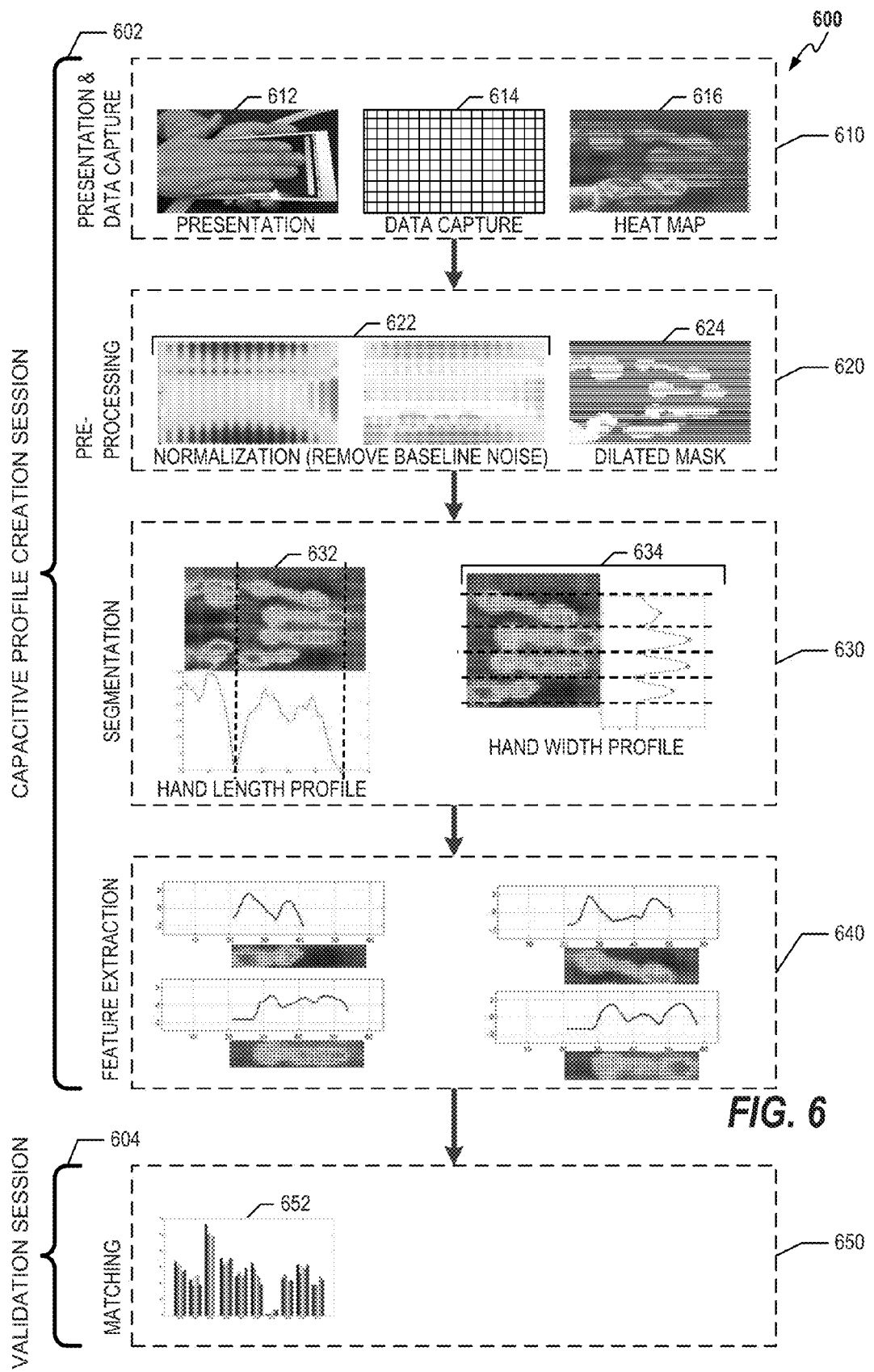
FIG. 6 is a flow diagram of a hand capacitive profiling process of the biometric authentication system configured in accordance with various aspects of the disclosed approach for biometric authentication using capacitive profiles.

FIG. 6 illustrates a hand biometric-based security process 600 configured in accordance with various aspects of the disclosed approach for biometric-based security using capacitive profiles in a biometric security system that utilizes a hand of a user as the body part for authentication. Various aspects of an operation for each portion of the hand biometric-based security process 600, which includes a presentation and data capture portion 610, a pre-processing portion 620, a segmentation portion 630, a feature extraction portion 640, and a matching portion 650, will be described herein with reference to the biometric security system including a touch screen integrating a capacitive sensor system with a capacitive sensor array, an example of which is illustrated in FIG. 13 as a capacitive sensor system 1300 that includes a capacitive sensor array 1310 that may be configured in accordance with various aspects of the disclosed approach for biometric-based security using capacitive profiles, as further explained herein.

In one aspect of the disclosed approach, similar to the finger biometric-based security process 100, a first part of the hand biometric-based security process 600, referred to and illustrated in FIG. 6 as a "capacitive profile creation session" 602 that includes the presentation and data capture portion 610, the pre-processing portion 620, the segmentation portion 630, and the feature extraction portion 640, may be used to create capacitive profiles, where each iteration of the capacitive profile creation session 602 may be used to create a single capacitive profile. As described further herein, each capacitive profile may be generated from a set of one or more captured raw capacitive frames and may be used for such purposes as: (1) establishing a biometric template for a body part such as the hand of the user, as previously described with reference to FIG. 3; or (2) performing authentication using the biometric template, as previously described with reference to FIG. 4.

A description of an iteration of the capacitive profile creation session 602 of the hand biometric-based security process 600 begins at the presentation and data capture portion 610, where the biometric security system requests and receives presentation by the user of a body part such as the hand during a presentation operation 612. Once the body part is presented, one or more raw capacitive frames may be captured of the body part using the capacitive sensor array 1310 in the capacitive sensor system 1300 during a data capture operation 614. In one aspect of the disclosed approach, the user may be prompted and is expected to place his hand on the touch screen for a duration of time such that the capacitive sensor array 1310, which operate at a particular frame rate, may capture a set of raw capacitive frames. As an example, the user may leave his hand on the touch screen for approximately 3-4 seconds and assuming the capacitive sensor array 1310 may operate at 120 frames/second, then approximately 360-480 frames may be captured. An example of a distribution of various levels of capacitance measured for the hand that may be captured in a frame during the data capture operation 614 of the presentation and data capture portion 610 is visually illustrated as a capacitive heat map image 616.

In one aspect of the disclosed approach for the presentation operation 612, the user may place his hand on the screen in a relaxed manner, preferably flat with all hands of the hand touching each other. This method of hand placement, generally referred to as an unconstrained presentation modality, removes a need for any type of guiding posts or other means to ensure compliance with rigid body part positioning requirements in an approach referred to generally as a constrained presentation modality.

Although the constrained presentation modality may provide such benefits as ease of hand length gauging where, for example, the body part to be analyzed is a hand and a predetermined anchor point of the hand is assumed, there are some drawbacks as well. For example, continuing with the discussion where the body part to be analyzed is the hand, rigid body part position requirements may be difficult for some people to meet and, having a fixed nature, almost eliminates extensibility to add other hands. Further, even though a particular position of the hand may be imposed, a position of the hand may still change for each capture. More importantly, the constrained presentation modality may be very difficult to achieve on some devices, especially where those devices have thick bezels around the touch screen, which may result in partial hand measurements.

In contrast, under the unconstrained presentation modality, users may more naturally position the body part to be analyzed, such as being able to place the hand on any part of the touch screen so that the whole length of the hand is within the touch screen—without having to worry about whether a palm portion of the hand is touching the touch screen as well. This allows full hand measurement, which may generally result in more consistent measurements. In addition, use of the unconstrained presentation modality provides extensibility of the various aspects of the disclosed approach for biometric authentication using capacitive profiles to multiple fingers, as described herein.

Once the set of raw capacitive frames are acquired during the presentation and data capture portion 610, the pre-processing portion 620 of the hand biometric-based security process 600 removes any noise or other undesirable data from the frames. In one aspect of the disclosed approach for pre-processing, a normalization operation 622 may be performed to remove noise inherent in operation of the capacitive sensor array 1310 in the capacitive sensor system 1300. This noise should be removed because it affects all captured frames as a baseline noise level of the capacitive sensor array 1310. The normalization process may include averaging data in raw capacitive frames captured from the capacitive sensor array 1310 for a short period of time where there are no objects placed on the capacitive sensor array 1310 so that the baseline noise level may be established. This baseline noise level may then be subtracted from all subsequent raw capacitive frames.

In another aspect of the disclosed approach for pre-processing, a masking operation 624 in the pre-processing portion 620 may involve creating a binary mask and identifying object contours using image dilation to create a dilated mask that may then be applied to each frame to filter out capacitive measurements that may not be of interest in the analysis. For example, the binary mask may be created for each frame by using a suitable threshold to separate touched/untouched sensors. Image dilation may then be used to enhance edges of the capacitive image of the captured body part by obtaining object contours to be masked before the dilated mask is applied to each frame to filter out the surrounding noise. Although description of various operations after the pre-processing portion 620 contained herein may refer to a processing of capacitive information associated with one or more capacitive data points, measurements, or levels from a particular frame in the set of raw capacitive frames, it should be noted that unless specifically referenced, this capacitive information preferably contains only capacitive data points, measurements, or levels that remain after the pre-processing portion 620 has removed and filtered any noise. Thus, for example, even though a particular area of a frame may have capacitive measurements with levels high enough to be included in an analysis of the frame in accordance with various aspects of the disclosed approach to create a capacitive profile, these capacitive measurements are irrelevant because they are associated with capacitive sensing elements that have not been touched but are caused by noise. Thus, these capacitive measurements should still be excluded if the particular area is not part of capacitive measurements within the dilated mask because they are not relevant to the analysis of the hand.

Figure 7:
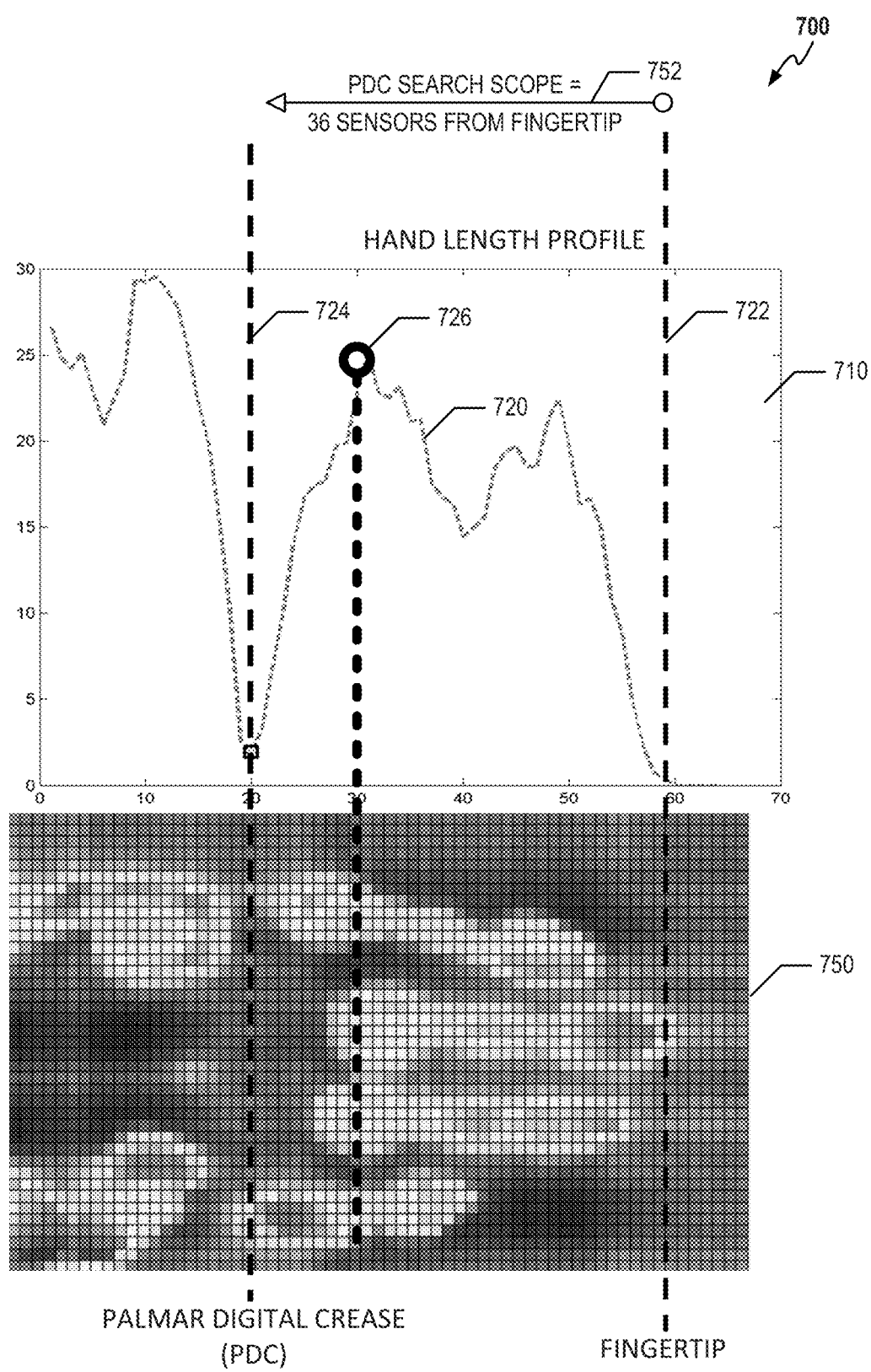
FIG. 7 is a comparison of a hand length profile and associated capacitive heat map image used to visually illustrate a distribution of capacitive values in a capacitive frame captured of the hand in the biometric security system configured in accordance with other various aspects of the disclosed approach for biometric-based security using capacitive profiles.
Figure 8:
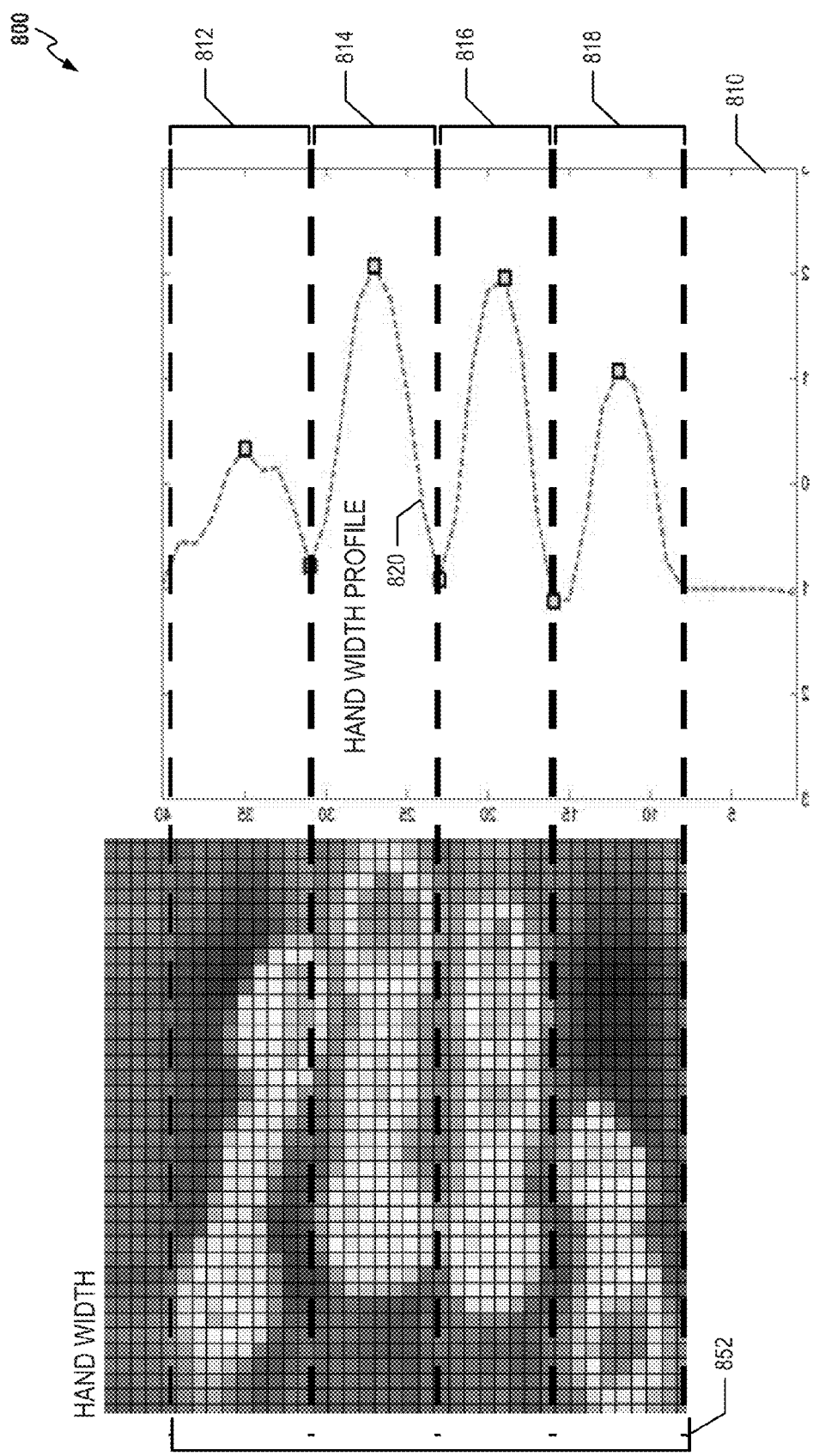
FIG. 8 is a comparison of a hand width profile and associated capacitive heat map image used to visually illustrate a distribution of capacitive values in a capacitive frame captured of the hand in the biometric security system configured in accordance with other various aspects of the disclosed approach for biometric-based security using capacitive profiles.

Continuing to refer to FIG. 6, the segmentation portion 630 of the hand biometric-based security process 600, which includes a hand length profile determination operation 632 and a hand width profile determination operation 634, may be used to create a capacitive profile. During the hand length profile determination operation 632, a location of the PDC, which as discussed previously is a feature of the hand where the hand meets a palm portion of the hand, is identified in the hand length profile. Identification of the PDC allows any data associated with the palm portion of the hand in the capacitive profile to be ignored, leaving only data associated with the fingers in the capacitive profile to facilitate processing of the capacitive profile for feature extraction, as later described herein. In order to facilitate the description and understanding of various operations in the segmentation portion 630, reference will be made to FIG. 7, which includes a comparison 700 of a hand length profile 720 plotted in a capacitive profile chart 710 to a capacitive heat map image 750. Reference will also be made to FIG. 8, which includes a comparison 800 of a hand width profile 820 plotted in a capacitive profile chart 810 to a capacitive heat map image 850

In one aspect of the disclosed approach for segmentation, the hand length profile determination operation 632 may locate a location of a tip of the hand using a mask such as the dilated mask created as described above during the masking operation 624 in the pre-processing portion 620. An example of a hand length profile that may be identified on the hand capacitive profile 720 by the hand length profile determination operation 632 is indicated by a dotted line 722.

In accordance with various aspects of the disclosed approach, a raw capacitive frame filtering may be used to filter and process the set of raw capacitive frames once the tip of the hand has been located. In one aspect of the disclosed approach, a time filter may be applied to the set of raw capacitive frames by averaging touch sensor data across all frames in the set of raw capacitive frames to generate a single, time-filtered capacitive frame referred to herein as a time-filtered capacitive frame. Each capacitive data point in the time-filtered capacitive frame is thus created based on an average of all capacitive measurement values from a corresponding capacitive data point in the raw capacitive frames in the set of raw capacitive frames. Thus, continuing with the example above where the capacitive sensor system 1300 operates at 120 frames/second, an average of each capacitive data point may be determined from either 360 capacitive data points if the presentation of the hand lasted exactly 3 seconds (such that 360 raw capacitive frames were captured), or 480 capacitive data points if the presentation of the hand lasted exactly 4 seconds (such that 480 raw capacitive frames were captured), where each capacitive data point in a particular raw capacitive frame was captured by a respective capacitive sensing element in the capacitive sensor array 1310. Although in the above example it is assumed that a period of time of data capture coincides exactly with a period of time of presentation, it should be noted that the period of data capture may not coincide with the period of presentation. Further, in other aspects of the disclosed approach, the number of raw capacitive frames over which each capacitive data point is averaged may vary, and it is within an expected implementation of the disclosed approach that lower and/or upper limits may be placed on a number of raw capacitive frames to be processed and combined; regardless of the number of raw capacitive frames actually captured.

In addition to the time filter described above, in another aspect of the disclosed approach a row filter may be applied to the time-filtered capacitive frame by summing all touch sensor data along each row of the time-filtered capacitive frame to create the hand length profile 720. As previously noted, each capacitive heat map image is a visual representation of a distribution of various levels of capacitance measurements stored in a respective frame. In FIG. 7, the capacitive heat map image 750 is a visual representation of the distribution of various levels of capacitance measurements for the hand in the time-filtered capacitive frame generated using the time filter. In one aspect of the disclosed approach, the hand capacitive profile 720 may be generated from a summation of normalized sensor output data stored in each row of the time-filtered capacitive frame, where capacitance data from all rows of the time-filtered capacitive frame, as represented by the capacitive heat map image 750, is summed and plotted as the hand capacitive profile 720 in the capacitive profile chart 710. It should be noted that the orientation of the capacitive heat map image 750 in FIG. 7 has been rotated such that an axis representing a touchscreen display height is horizontally displaced with respect to the bottom of FIG. 7. Thus, any reference to a summation of capacitance values in each "row" of the time-filtered capacitive frame is actually a reference to a summation of capacitance values in a vertical orientation as illustrated by the capacitive heat map image 750 in FIG. 7.

A PDC identification operation may be used to identify the PDC in the hand length profile 720 once the row filter operation has been completed. In one aspect of the disclosed approach, a portion of the hand length profile 720 with a predetermined length that is at least as long as a longest previously recorded measurement of a human index finger, which is approximately 8.5 cm, is analyzed. This predetermined length is referred to and illustrated as a PDC search scope 752 in FIG. 7 and a geometry of the capacitive sensing elements, which is known, may be used to determine how many rows of data in the frame should be analyzed. For example, if a pitch between capacitive sensing elements is 0.24 cm, then 36 rows of data in the time-filtered capacitive frame corresponding to 36 sensors in length, where:

$$36 \text{ sensors} \times 0.24 \text{ cm/sensor} = 8.64 \text{ cm}, \qquad (2)$$

may be analyzed to meet the 8.5 cm minimum required length. A valley detector may be run over the PDC search scope 752 to identify the PDC in a base portion of the hand capacitive profile 720 where a location of a border of the palm portion is expected. Referring again to the hand capacitive profile 720, a PDC for the hand is illustrated by a dotted line 724.

Once the location of the PDC has been identified and the palm portion has been removed by the hand length profile determination operation 632, the hand width profile determination operation 634 may operate to determine a width of the hand as well as identify a portion in the hand width profile 820 associated with each finger. The capacitive data containing the capacitance values captured by the capacitive sensor array 1310 in the capacitive sensor system 1300, as represented by the capacitive heat map 850, is summed along a columns to generate a 1-D horizontal hand width profile, which represents a width of the hand, and a width of the individual fingers as well as the relative strength of each finger peak. Thus, a hand width 852 may be determined, and then a portion associated with each finger, such as an index finger portion 812, a middle finger portion 814, a ring finger portion 816, and a little finger portion 818, may be identified. In other words, the hand width profile 820 may be sub-divided to locate portions in the capacitive heat map associated with each finger.

Figure 9:
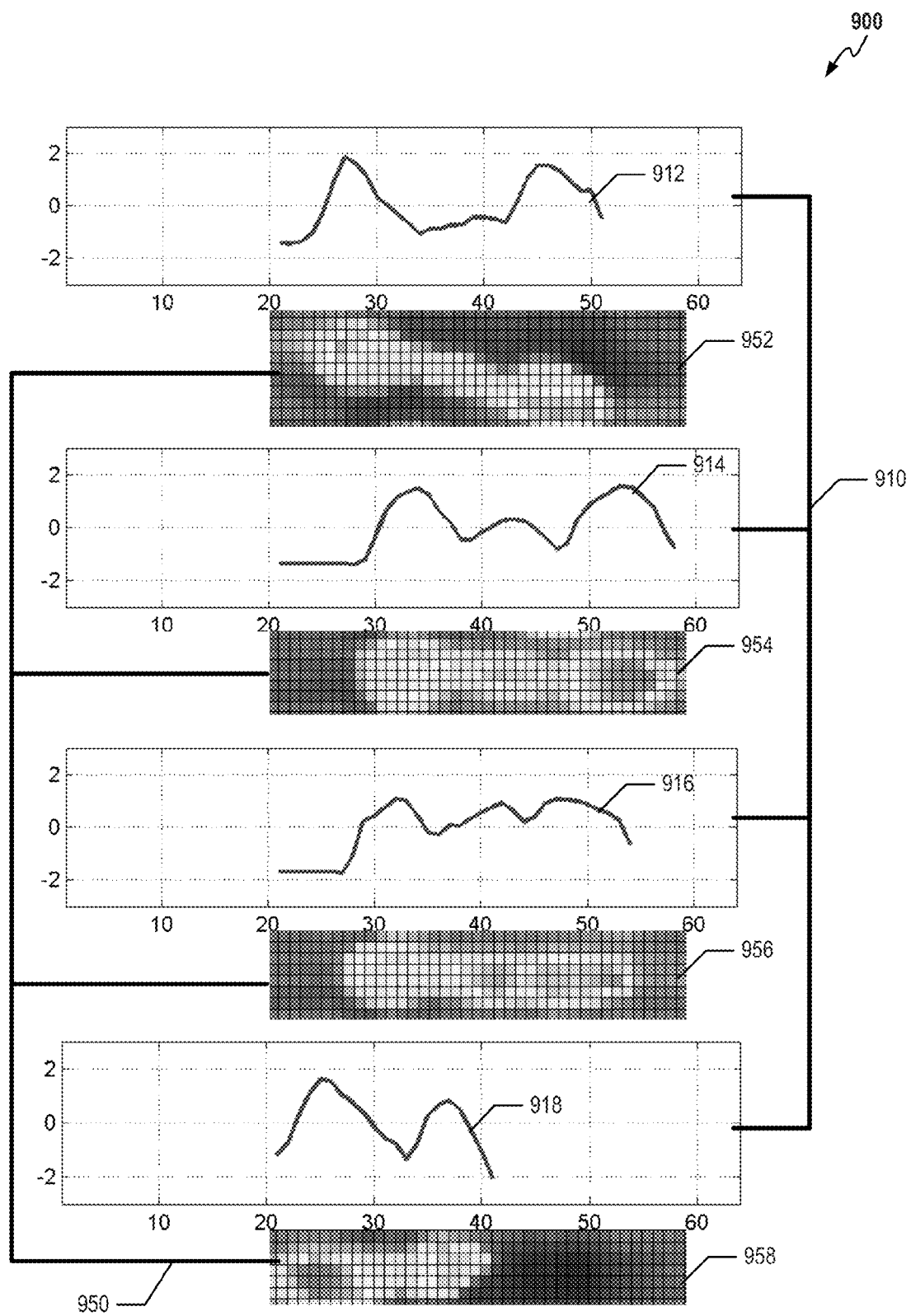
FIG. 9 is a comparison of a finger length profile and associated capacitive heat map image used to visually illustrate a distribution of capacitive values in a capacitive profile captured of each finger of the hand in the biometric security system configured in accordance with other various aspects of the disclosed approach for biometric-based security using capacitive profiles.

The feature extraction portion 640 of the hand biometric-based security process 600 may be used to convert each portion of the hand width profile 820 capacitive profile, such as the index finger portion 812, the middle finger portion 814, the ring finger portion 816, and the little finger portion 818, to a z-score starting from the location of the finger tip to the PDC. Referring to FIG. 9, which compares a plurality of finger capacitive profiles 910 to a plurality of capacitive heat maps 950 in one aspect of the disclosed approach a z-score value is dependent on such factors such as a number of sensors touched in each row; body part (e.g., hand) geometry such as, for example, length, width, area, etc.; pressure of user's presentation; capacitance level of each touched sensor; and variations in conductivity across the skin, which may or may not be due to skin moisture. In one aspect of the disclosed approach, the plurality of finger capacitive profiles 910 is determined from having the hand width profile 820 divided to only consider each finger.

For example, as shown in FIG. 9, an index finger capacitive profile 912, a middle finger capacitive profile 914, a ring finger capacitive profile 916, and a little finger capacitive profile 918 may each be converted to a z-score starting from the location of the finger tip to the PDC. By summing along the touched rows of a capacitive frame for each finger, as represented visually by an index finger capacitive heat map 912, a middle finger capacitive heat map 914, a ring finger capacitive heat map 916, and a little finger capacitive heat map 918 may each be converted to a z-score starting from the location of the finger tip to the PDC a 1-D vertical profile for each finger may be created.

By summing only the rows and columns associated with each individual finger, a length profile is generated that represents the user's finger dimensions and capacitive signature. This 1-D representation of the finger is an accumulation of finger segment length and width as measured by the capacitive touch screen. Some user's finger 1-D capacitive profiles provide two very distinct joints, while many others do not. By using the 1-D capacitive profile, all finger dissimilarities may be determined in the data, such as the relative level of capacitance distributed across the hand (as shown in the heat map and on the y-axis in the graph) in addition to simple measurement of finger segment lengths by using the number of touched capacitive sensors within each segment (as shown on the x-axis in the graph). Thus, not only are users differentiated based on a number of simple lengths and widths of phalangeal joints, but perhaps more powerfully on the unique capacitance levels of each point in the profile.

In a second part During an authentication operation, each point of the capacitive profile may then be used by a matching operation, such as Euclidean distance, Hamming distance, etc., to evaluate if the verification data matches the capacitive profile stored in the biometric template at a given threshold. If the biometric template matches, then the user is authenticated, and if there is no match then authentication is denied.

In one aspect of the disclosed approach, as described herein, during an enrollment process an enrollment template that is created to authenticate a user may be generated from a number of capacitive profiles. For example, an exemplary number of capacitive profiles that may be averaged to create an enrollment template as used herein is three (3) capacitive profiles. However, any number of capacitive profiles may be combined, each of which is created through an operation of the capacitive profile creation session 602, which is the first part of the hand biometric-based security process 600 that includes the presentation and data capture portion 610, the pre-processing portion 620, the segmentation portion 630, and the feature extraction portion 640, as discussed above. Thus, one or more capacitive profiles, referred to as enrollment capacitive profiles, may be used to establish a biometric template for a hand of the user.

In addition, during an authentication process, one or more capacitive profiles may also be captured utilizing the capacitive profile creation session 602 previously used to capture the enrollment capacitive profiles used to generate the biometric template during the enrollment process. During a validation session 604 in a second part of the hand biometric-based security process 600, an authentication capacitive profile may be compared to the biometric template to perform authentication of the user utilizing the matching portion 650 in accordance with various other aspects of the disclosed approach, as further described herein. In other words, the first part of the hand biometric-based security process 600 that was used to create the set of enrollment capacitive profiles for establishing the biometric template may also be used to create a capacitive profile referred to as an authentication capacitive profile. The authentication capacitive profile may be compared to the biometric template using a matching operation 652 in the matching portion 650 of the hand biometric-based security process 600, as described herein.

In accordance with various aspects of the disclosed approach, during an authentication operation based on the matching operation 652, each point of the authentication capacitive profile may be compared a respective point in the biometric template using a standard matching algorithm, such as Euclidean distance, Hamming distance, etc., to evaluate if the verification data matches the biometric template at a given threshold. Thus, as used herein, the term "matched" or "matches" may refer to an authentication capacitive profile with a capacitive measurement distribution that does not have to be identical to the biometric template. If the authentication capacitive profile matches with the biometric template, then the user is authenticated, and if there is no match then authentication is denied.

As discussed herein, the hand width profile and the finger length profiles may be stored on the device and they may collectively be used as the capacitive signature of the user's hand.

Figure 10:
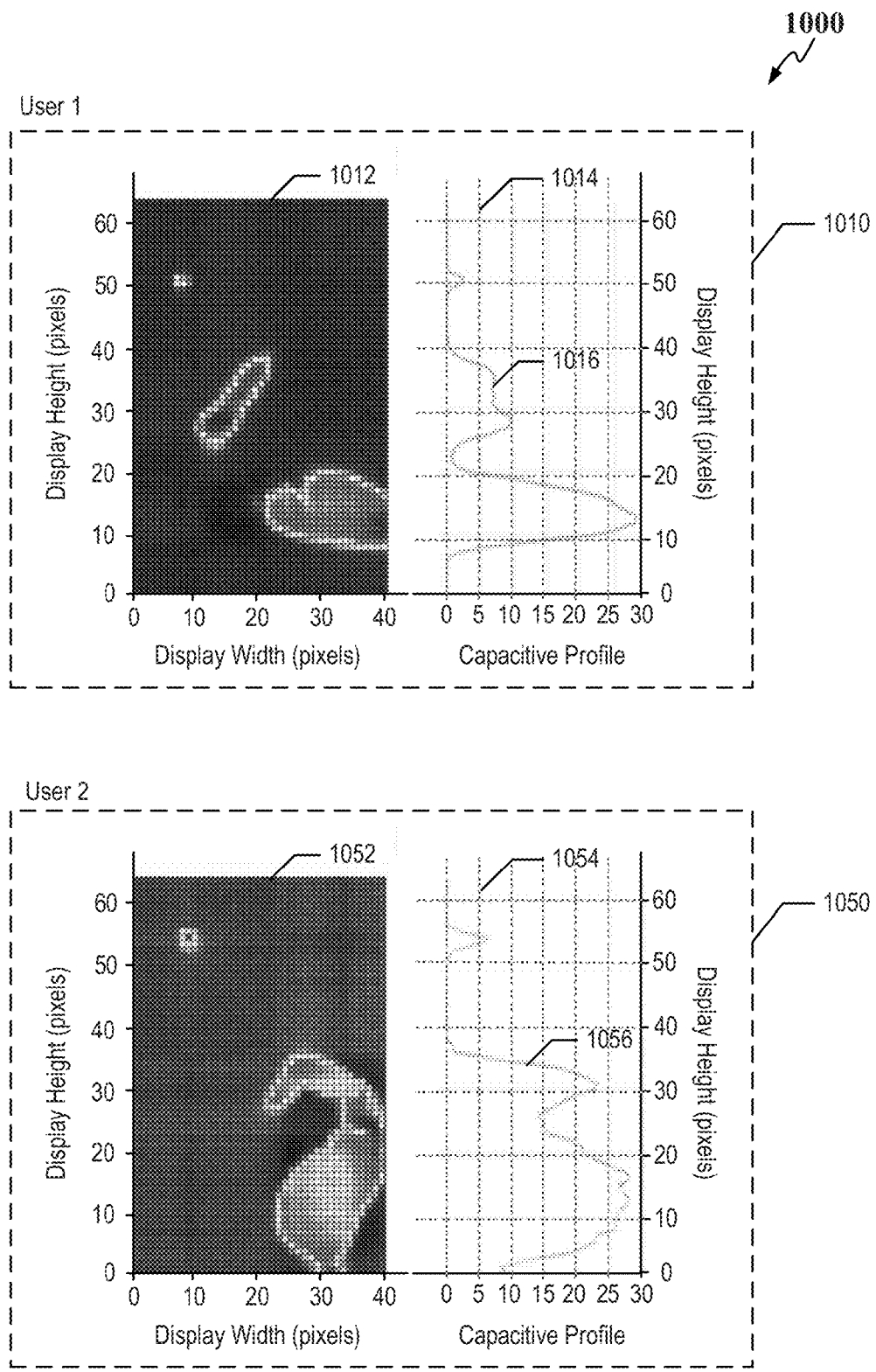
FIG. 10 is a comparison of capacitive heat maps and associated capacitive palm profiles when using a passive stylus for two users used to describe biometric authentication based on a palm profile in the biometric authentication system configured in accordance with other various aspects of the disclosed approach for biometric authentication using capacitive profiles.

In addition to the examples provided herein, such as hands, and fingers, the various aspects of the disclosed approach for biometric authentication using capacitive profiles may be applied to other body parts and authentication modalities. For example, authentication may be performed based on capacitive profiles captured using a capacitive sensing system integrated into a display device to implement a touch screen while a user interfaces with the capacitive sensing system using a stylus. FIG. 10 illustrates a comparison 1000 of two set of capacitive heat maps and associated capacitive palm profiles 1010, 1050 for User 1, User 2, respectively that may be used to describe biometric authentication based on a palm profile in the biometric authentication system configured in accordance with other various aspects of the disclosed approach for biometric-based security using capacitive profiles. Referring to the comparison 1000, it may be seen that a capacitive heat map 1012 for User 1 as compared to a capacitive heat map 1052 for User 2, as well as a capacitive profile chart 1014 for User 1 as compared to a capacitive profile chart 1054 for User 2 clearly shows a difference between the collected capacitive profiles and capacitive heat maps. Referring to the capacitive profile plot 1016 for User 1 as well as the capacitive profile plot 1056 for User 2, the uniqueness of each user's grip is apparent in these capacitive length profile graphs. Capacitive profile width graphs may also be created via the touch sensor columns and combined with length graphs to authenticate or identify the user. Continuous authentication while the user is writing may also be possible using this same method.

Figure 11:
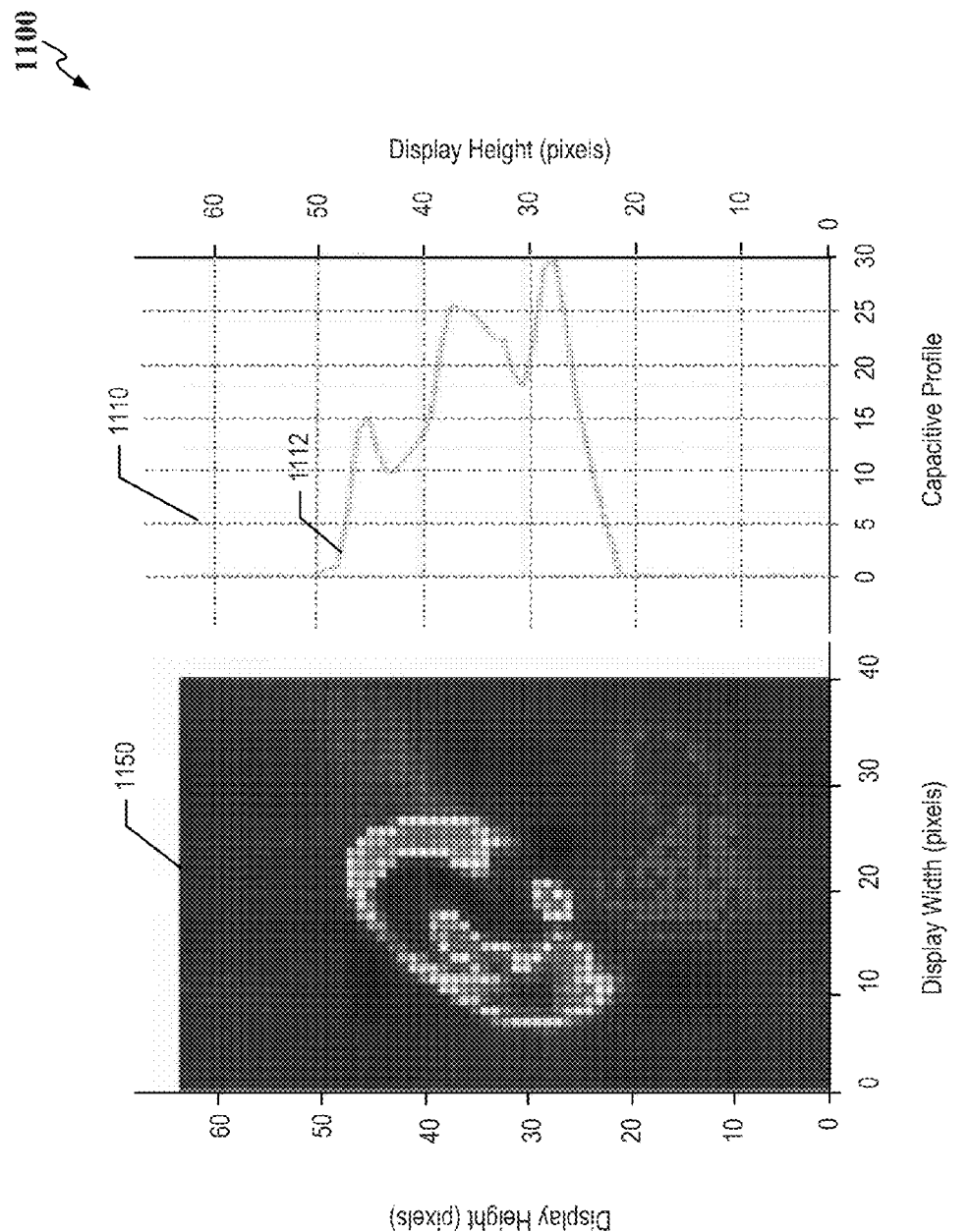
FIG. 11 is a capacitive heat map and associated capacitive ear profile for a user used to describe biometric authentication based on an ear profile in the biometric authentication system configured in accordance with still other various aspects of the disclosed approach for biometric authentication using capacitive profiles.

As another example of a body part that may be used for biometric authentication, FIG. 11 illustrates a capacitive heat map 1150 and associated capacitive palm profile 1110 in another aspect of the disclosed approach, where an earprint on the touch screen device is shown with a corresponding capacitive length profile 1112. A width profile could also be produced. An earprint is another biometric modality that could make use of the flow outlined above for authentication.

In other aspects of the disclose approach for biometric authentication using capacitive profiles, the biometric authentication approach described herein may be used in parallel with other viable biometric methods such as fingerprint, facial biometrics, voice biometrics, iris scans, or other methods. Thus, any number of biometric modalities may be fused together via a multimodal fusion algorithm for a more accurate and higher security system. In addition, the biometric authentication approach described herein may be advantageously used to both authenticate the user and wake a device that may be locked and asleep, such as in a low-power state.

Existing multi-touch approaches to authentication typically require a multi-touch output of touch controllers. Various aspects of the disclosed approach may be either integrated into a touch controller or make use of unprocessed touch screen data, resulting in significantly improved performance In accordance with various aspects of the disclosed approach, because a biometric template is not limited to a particular portion of a body part but may include other portions of the body part (e.g., an enrollment process for a hand may include capture of a capacitive profile for all fingers such that portions of the biometric template for the hand may include a capacitive profile for each finger), the concepts described herein may be extended in a variety of ways. A palm portion of the handprint may also be used, which means the biometric template may include a combination of one or more fingers and palm of the hand. The disclosed approach even contemplates being able to authenticate using any available portion of the particular part of the biological entity that is used for authentication purposes. For example, even a portion of the finger identified in a capacitive heat map captured during a biological authentication process may be matched to the biometric template.

Figure 12:
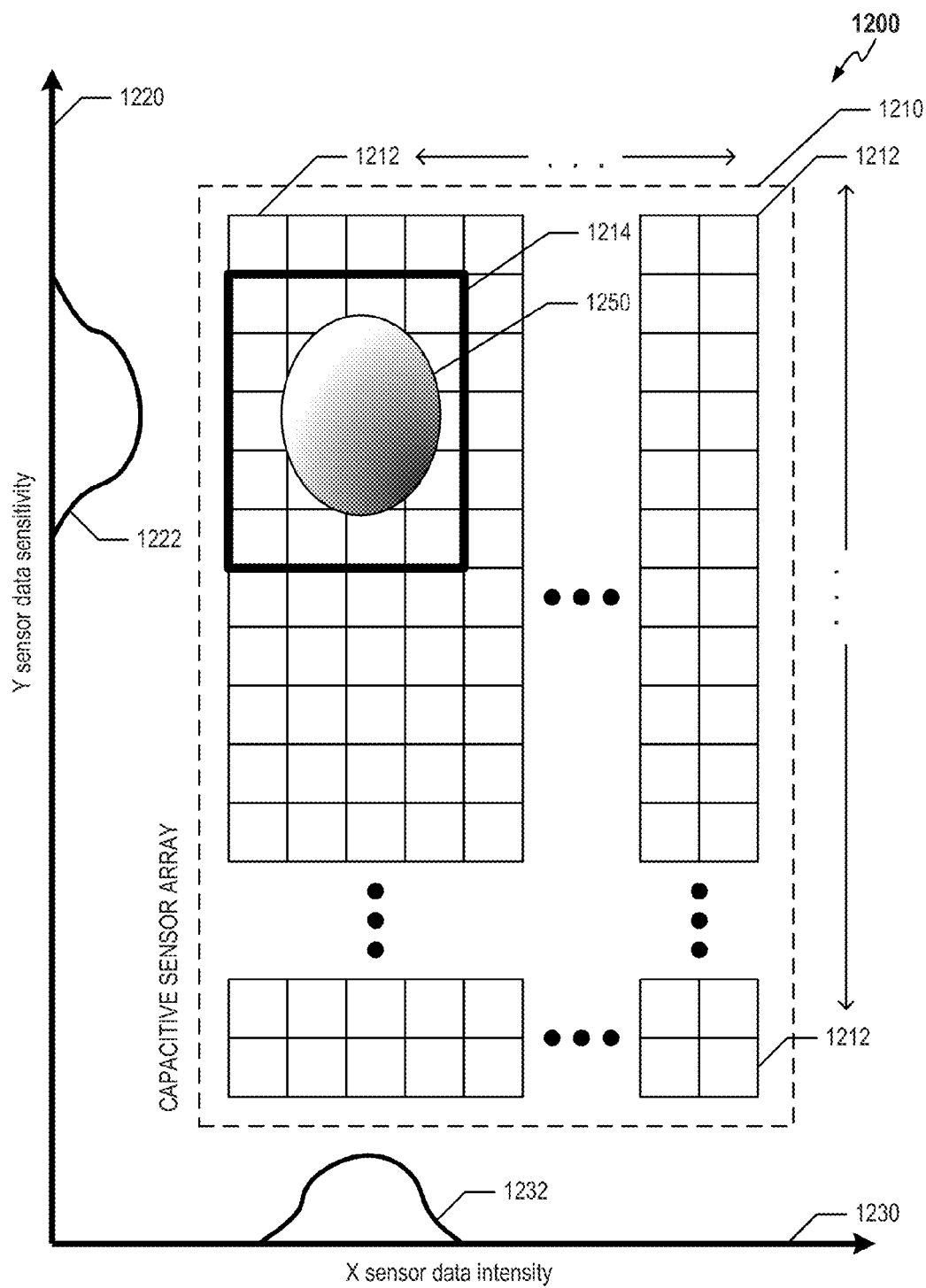
FIG. 12 is a diagram including a plot of detected sensor signals as overlaid on a capacitive touch sensor array to describe an operation of various capacitive touch sensor arrays that may be used with the biometric authentication system configured in accordance with various aspects of the disclosed approach for biometric authentication using capacitive profiles.

FIG. 12 illustrates how a capacitive touch sensor array, illustrated as a capacitive sensor array 1210, works by measuring a capacitance of each capacitive sense element 1212 in the capacitive sensor array 1210, and looking for a change in the capacitance indicating a touch or presence of a conductive object. The capacitive sensor array 1210 may be used to describe an operation of various capacitive touch sensor arrays that may be used with the biometric security system configured in accordance with various aspects of the disclosed approach for biometric-based security using capacitive profiles. A plot 1200 of detected sensor signals 1222, 1232 in respective Y and X axes 1220, 1230, as laid next to a capacitive touch sensor array 1210, shows that when a conductive object such as, for example, a finger, hand, or other object, as illustrated as a finger 1250 comes into contact or close proximity with capacitive sense elements such as a group of capacitive sensor elements 1250, capacitance changes and thereby the conductive object is detected. As further described herein, an electrical circuit may be configured to measure the capacitance changes of the group of capacitive sensor elements 1250 and then convert the measured capacitances into digital values.

FIG. 13 illustrates the capacitive sensor system 1300 that may include a capacitive sensor array 1310 configured to capture raw capacitive frames in accordance with various aspect of the disclosed approach for biometric-based security using capacitive profiles. In one aspect of the disclosed approach, the capacitive sensor array 1310 may include a plurality of capacitive sensor elements, where a capacitance sensing circuit 1312 is illustrated as a representative capacitive sensor element in the capacitive sensor array 1310. A pair of capacitive sensing element connection buses 1322, 1324 facilitates coupling of each capacitive sensing elements of the capacitive sensor array 1310 to a processing circuit such as an analog-to-digital (A/D) converter 1330 to provide a digital representation of a capacitance value as measured by each capacitor sensing element. In one aspect of the disclosed approach, the A/D converter module 1330 allows direct reporting of capacitance values measured by the plurality of the capacitive sensing elements with a resolution of 14 bits at a sample rate of 120 frames/second. In other words, a raw capacitive frame may be captured in as little as $\frac{1}{120}^{th}$ of a second with 16,384 levels of capacitance as measured by each of the capacitive sensing elements being differentiable because 14 bits are being used to quantize each capacitance level. The high rate of capture allows the sensor system 1300 to capture multiple samples of a presented body part and facilitates baseline noise filtering, as discussed herein.

Preferably, raw capacitive frames and, ultimately, capacitive profiles, may be generated as described with reference to various examples provided above, after the "raw" data received by the A/D converter module 1330 is converted to a digital representation and sent to a processing system in the biometric authentication system configured in accordance with various aspects of the disclosed approach for biometric-based security using capacitive profiles. As previously discussed, providing direct access to capacitance levels as measured by the plurality of capacitive sensing elements to the detection and processing circuits in the biometric authentication system avoids reduction of functionality and efficacy caused by approaches that use data that have already been processed by touch screen controllers and therefore not able to provide the various benefits noted herein.

Although description of the sensor system 1300 contained herein has been predicated by the sensor system 1300 being integrated into a touch screen, it should be understood that the sensor system 1300 may be used in implementing a variety of user interfaces including, but not limited to, touchpads, trackpads, and the like. These user interfaces may be integrated into a variety of devices including, but not limited to, computer servers, desktop computers, laptops, tablet computing devices, mobile devices, music devices, video devices, cellular telephones, and smartphones. Also, it should be noted that the capacitive sensor array 1310 may be configured in various geometric shapes including, but not limited to, a square, a rectangle, a circle, or a ring. Further, the capacitive sensor array 1310 may be arranged as a shape that is not limited to two dimensions. For example, the capacitive sensor array 1310 may be arranged on a three-dimensional (3D) shape including, but not limited to, a sphere, a cylinder, and other 3D shapes including other regular or even irregular shapes.

Figure 14:
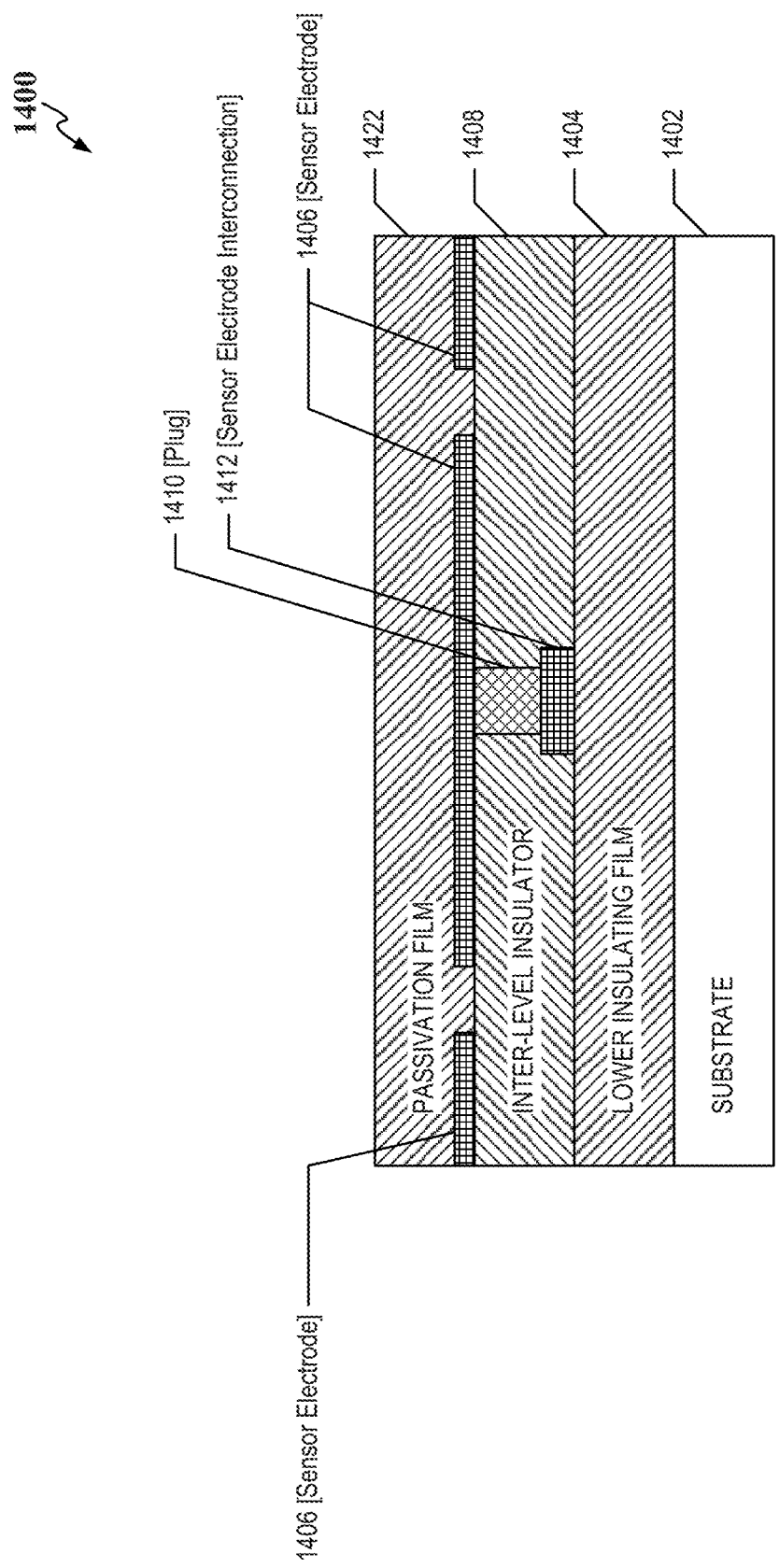
FIG. 14 is a cross-sectional profile view of an exemplary capacitance sensing structure that may be used to implement the capacitance sensing circuit in the capacitive sensor array of FIG. 13 in accordance with one aspect of the disclosed approach for biometric authentication using capacitive profiles.

FIG. 14 illustrates an exemplary capacitance sensing structure 1400 that may be used as part of the capacitance sensing circuit 1312 of the capacitive sensor array 1310. In one aspect of the disclosed approach for biometric-based security using capacitive profiles, the capacitance sensing structure 1400 may be configured to allow a capacitance element to be formed when a surface of the body part is brought near or in contact with the capacitance sensing structure 1400. For example, the capacitance element may be a capacitor structure created by the surface of the body part acting as a first plate of the capacitor structure and an electrode in the capacitance sensing structure 1400 as a second plate of the capacitor structure. The surface of the body part and the electrode may be separated by a distance that includes any materials covering the electrode and a space between the surface of the body part and the materials covering the electrode if the surface of the body part is not directly in contact with the materials covering the electrode. The distance determines a level of capacitance created in the capacitance element.

As shown in FIG. 14, the capacitance sensing structure 1400 may include multiple sensor electrodes 1406 that are formed on an inter-level insulator 1408. Each of the multiple sensor electrodes 1406 may be connected to a sensor electrode interconnection 1412 by a plug 1410 in a through hole formed in the inter-level insulator 1408. The sensor electrode interconnection 1412 is formed on a lower insulating film 1404 on a semiconductor substrate 1402. A passivation film 1422 is formed on the inter-level insulator 1408 and covers the multiple sensor electrodes 1406.

During operation of the capacitance sensing circuit 1400, when a body part surface such as a skin surface of the body part comes into contact with or is near enough to the passivation film 1422 to affect the capacitance sensing circuit 1400, a capacitor structure is formed by the body part surface and each affected sensor electrode of the multiple sensor electrodes 1406, where the body part surface and each affected sensor electrode forms a first plate and a second plate, respectively, of a respective capacitor structure. The first plate and the second plate of this capacitor structure are spaced apart by a distance that is minimally a thickness of the passivation film 1422 to create a capacitance level based on the distance. The capacitance that is created between the body part surface and the sensor electrode 1406 may be detected through the sensor electrode interconnection 1412.

In effect, sensing for the capacitance sensing circuit 1400 is achieved as a basis of a distance difference between a skin surface as one plate and a sensor electrode as another plate, thereby detecting a capacitance level based on these two plates. In another possible configuration of the capacitance sensing circuit 1400, a second sensor electrode (not shown) may be included near the sensor electrode 1406 of the capacitance sensing circuit 1400, and a difference from this second sensor electrode acting as a reference plate may be used for actual sensing.

In accordance with various aspects of the disclosed approach for biometric authentication using capacitive profiles, a plurality of capacitance sensing structures similar to the capacitance sensing structure 1400 may be mounted on an integrated circuit (IC) chip that may also include capacitance detection circuit for detecting a capacitance level of each of the sensor electrodes 1406, a processing circuit such as the A/D converter module 1330 for receiving and processing output from the capacitance detection circuit. The IC chip may also contain a storage circuit that stores any data necessary for the operation of the disclosed approach, as further described herein, and a comparison circuit for comparing raw capacitive profiles stored in the storage circuit with an authentication template.

Although relevant features of a hand such as length and width may be extracted with touch sensors spaced as far apart as 4.5 mm, higher density arrangements of the capacitive sensor elements in the capacitive sensor array 1310 may generally result in more features being extracted utilizing various aspects of the disclosed approach for biometric-based security using capacitive profiles. In other words, smaller distances between each of the capacitance sensing circuit 1312 in the capacitive sensor array 1310 may generally allow capture of raw capacitive frames with higher definition and lower variability, which ultimately may generally result in capacitive profiles and enrollment templates with more information and result in a more robust and greater performing system. Using an exemplary circuit such as the capacitance sensing circuit 1312, it is preferable that about a separation of 0.85 mm or less exists between touch sensor centers, providing about 30 DPI. In general, in accordance with various aspect of the disclosed approach for biometric-based security using capacitive profiles, the capacitive sensor array 1310 preferably includes a density of the capacitance sensing circuit 1312 that is as high as possible to allow improved physiological feature extraction.

Touch screens in most current consumer products have a touch resolution of approximately 5 millimeters per pixel (mm/pixel), with the industry trending towards denser touch resolutions. For example, development and deployment of touch screens with denser touch resolutions of 2.4 mm/pixel to sub-1 mm/pixel are expected. Denser touch resolution allow for more fine-grained resolution of variations of raw capacitive profiles to be captured, which means that raw capacitive profiles that more accurately reflect capacitive characteristics used to authenticate a biological entity may be created. It is to be noted that the touch resolution used to capture raw capacitive profiles for creation of an authentication template may not be equal to the touch resolution used to capture raw capacitive profiles for comparison to the authentication template.

Figure 15:
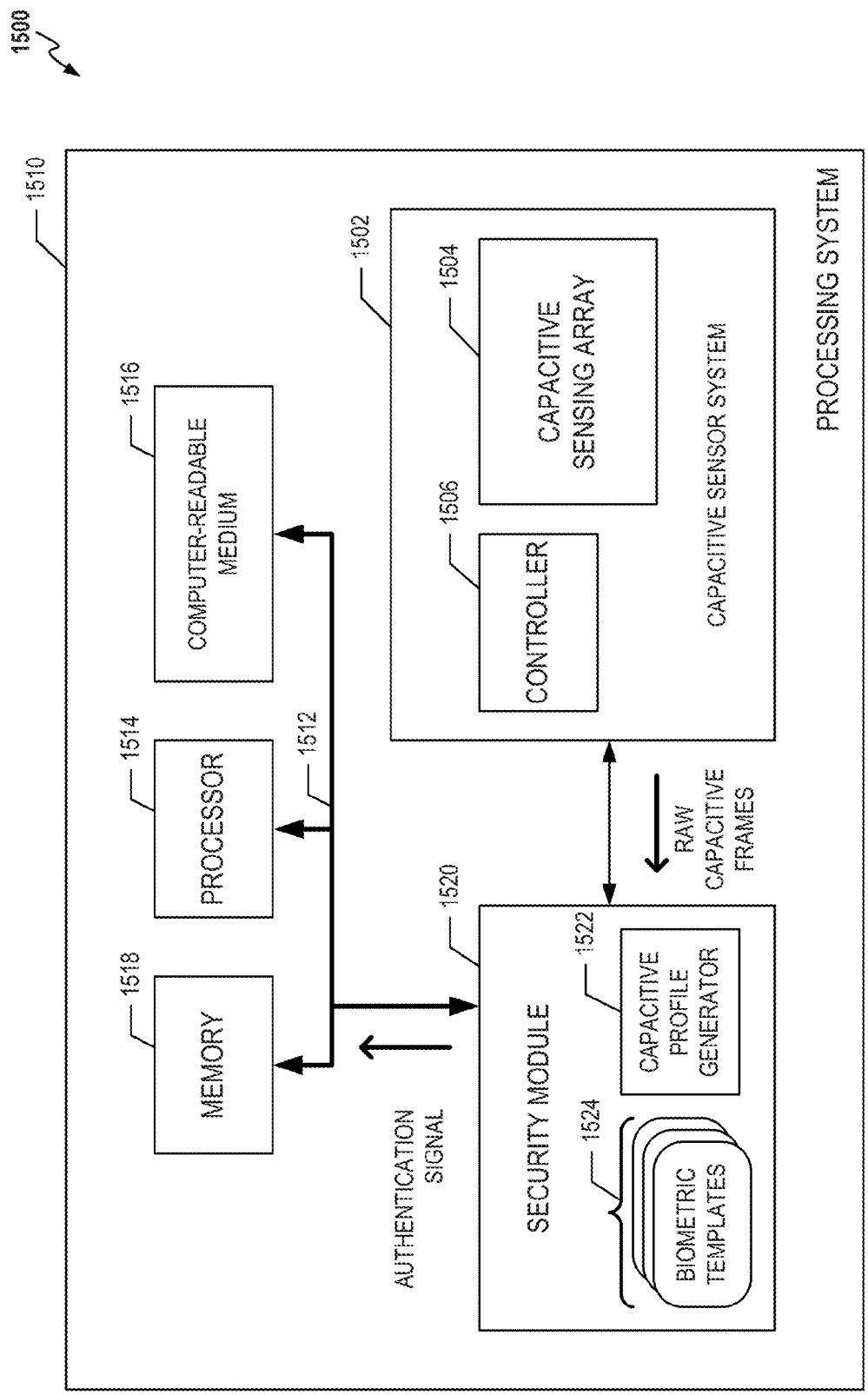
FIG. 15 is a block diagram illustrating an example of an apparatus employing a processing system that may be used to implement the biometric authentication system configured in accordance with various aspects of the disclosed approach for biometric authentication using capacitive profiles.

FIG. 15 is a conceptual diagram illustrating an example of a hardware implementation for an apparatus 1500 employing a processing system 1510 that may utilize various aspects of the disclosed approach for biometric-based security using capacitive profiles. Thus, in accordance with various aspects of the disclosure, an element, or any portion of an element, or any combination of elements in the apparatus 1500 that may be used to implement any device, including a mobile device, may utilize biometric-based security using capacitive profiles described herein.

For example, the processing system 1510 includes one or more processors illustrated as a processor 1514. Examples of the processor 1514 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processor 1514 may be used to provide processor functionality for the apparatus 1500. For example, if the apparatus 1500 is a tablet or a mobile device such as a mobile phone, the processor 1514 may be used to execute code and algorithms necessary to operate the apparatus 1500, such as an operating system and various applications of the tablet or mobile device. Further, the processor 1514 may be used to implement, for example, the operations described in the finger biometric-based security process 100 of FIG. 1; the biometric enrollment process 300 of FIG. 3; the biometric verification process 400 of FIG. 4; and hand biometric-based security process 600 of FIG. 6.

The processing system 1510 may be implemented as having a bus architecture, represented generally by a bus 1512. The bus 1512 may include any number of interconnecting buses and bridges depending on the specific application of the processing system 1510 and overall design constraints. The bus 1512 links together various circuits including one or more processors (represented generally by the processor 1514), a memory 1518, and computer-readable media (represented generally by a computer-readable medium 1516). The bus 1512 may also link various other circuits such as timing sources, peripherals, voltage regulators, and power management circuits, which are well known in the art, and therefore, will not be described any further. A bus interface 1520 provides an interface between the bus 1512 and a transceiver 1550. The transceiver 1550 provides a means for communicating with various other apparatus over a transmission medium. Depending upon the nature of the apparatus, a user interface 1530 (e.g., keypad, display, speaker, microphone, joystick) may also be provided.

The processor 1514 is responsible for managing the bus 1512 and general processing, including execution of software that may be stored on the computer-readable medium 1516 or the memory 1518. The software, when executed by the processor 1514, causes the processing system 1510 to perform the various functions described herein for any particular apparatus. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The computer-readable medium 1516 or the memory 1518 may also be used for storing data that is manipulated by the processor 1514 when executing software; capacitive profiles and biometric templates generated by the various operations contained herein; and any other suitable data. The computer-readable medium 1516 may be a non-transitory computer-readable medium such as a computer-readable storage medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. Although illustrated as residing in the processing system 1510, the computer-readable medium 1516 may reside externally to the processing system 1510, or distributed across multiple entities including the processing system 1510. The computer-readable medium 1516 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one aspect of the disclosed approach, the processing system 1510 may include a capacitive sensor system 1502 that includes a capacitive sensing array 1504 and a controller 1506. The controller 1506 may be used to control various aspects of operation of the capacitive sensor system 1502, including capturing one or more raw capacitive frames of a presented body part as sensed by the capacitive sensing array 1504. The capacitive sensing array 1504 may be implemented using a capacitive sensor array such as that described as the capacitive sensor array 1310 in FIG. 13.

A security module 1520 may be coupled to the capacitive sensor system 1502 to receive and process the raw capacitive frames captured using the capacitive sensing array 1504 and provided by the by controller 1506. The security module 1520 may also generate one or more capacitive profiles via a capacitive profile generator 1522 implementing a capacitive profile creation process such as that described in either the capacitive profile creation session 102 of the finger biometric-based security process 100 of FIG. 1, or the capacitive profile creation session 602 of the hand biometric-based security process 600 of FIG. 6. The security module 1520 may also generate and store any number of biometric templates 1524 created using an enrollment process such as that described in the biometric enrollment process 300. Further, the security module 1520 may also compare capacitive profiles to biometric templates that were previously stored during an enrollment process to perform authentication using a verification process such as that described in the biometric verification process 400 of FIG. 4. Based on a comparison, the security module 1520 may provide an authentication signal on the bus 1512. Thus, in various aspects of the disclosed approach, the security module 1520 may be used in addition to, or instead of, the processor 1514 to provide security-specific features. Consequently, the features described for the processor 1514 may apply equally to the security module 1520. As noted, risk of tampering is decreased and security is increased if the security module 1520 and the capacitive sensor system 1502 are integrated in a single device, such as an integrated circuit.

For example, the security module 1520 may implement a biometric security procedure for a capacitive sensor system such as the capacitive sensor system 1502 that includes capturing a set of raw capacitive frames for a body part via the capacitive sensor system 1502, wherein each raw capacitive frame includes a distribution of a plurality of capacitance levels measured from the body part; creating a capacitive profile based on the set of raw capacitive frames; comparing a first value in the capacitive profile to a second value in a biometric template generated from an enrolled body part, wherein the first value and the second value are located at a similar location with respect to the capacitive profile; and, generating an authentication signal based on a difference between the first value and the second value.

In one aspect of the disclosed approach, creating the capacitive profile based on the set of raw capacitive frames may include combining the set of raw capacitive frames to create a combined capacitive frame. The combined capacitive frame may include a distributed plurality of averaged capacitance levels, each of which may be an average of all capacitance levels for a respective location across all raw capacitive frames in the set of capacitive frames. In another aspect of the disclosed approach, the authentication signal may indicate a reasonable match has been determined between the capacitive profile and the biometric template. In yet another aspect of the disclosed approach, the authentication signal identifies the body part as the enrolled body part.

The first value and the second value from the capacitor profile and the biometric template, respectively, may each include a capacitive value determined from capacitive sensor measurements captured by a portion of a capacitive sensor array such as the capacitance sensing array 1504. In one aspect of the disclosed approach, the capacitive value may include a sum of the capacitive sensor measurements. In another aspect of the disclosed approach, the capacitive sensor measurements from the portion of the capacitive sensor array may include a plurality of capacitive sensor measurements taken along one of a vertical or horizontal direction with respect to the capacitive sensor array.

As discussed above, the biometric templates 1524 may be generated from one or more capacitive profiles, each capacitive profile generated from one or more raw capacitive frames captured by the capacitive sensor system 1502 in contact with the enrolled body part. Each capacitance level of the plurality of capacitance levels may include a capacitance level sensed by a capacitive sensing element in the capacitive sensor system 1504. The capacitive sensor system may include an arrangement of capacitive sensing elements in a particular shape and the plurality of capacitance levels contained in each raw capacitive frame may be arranged in accordance with the particular shape.

Various aspects of the disclosed approach may require means to perform certain functions, such as means for creating a capacitive profile based on the set of raw capacitive frames, which includes means for combining the set of raw capacitive frames to create a combined capacitive frame that includes a distributed plurality of averaged capacitance levels, each of which being an average of all capacitance levels for a respective location across all raw capacitive frames in the set of capacitive frames. These and other means maybe implemented using one or more of the modules disclosed herein. For example, the security module 1520 may be used to implement the means for combining the set of raw capacitive frames to create a combined capacitive frame as well as the means for creating a capacitive profile based on the set of raw combined frames. It should be noted, however, that the means may also be implemented using various combinations of the processor 1514, the memory 1518, and the computer-readable medium 1516. Thus, the various hardware used in the description provided herein should not be taken as a limiting disclosure but merely examples of what elements may be used.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A biometric authentication apparatus comprising:
a capacitive sensor system configured to capture a set of raw capacitive frames for a body part, wherein each raw capacitive frame includes a distribution of a plurality of capacitance levels measured from the body part;
means for creating a capacitive profile based on the set of raw capacitive frames; and
a processing system configured to:
compare a first value determined from a sum of capacitive sensor measurements captured by a row of a capacitive sensor array to a second value in a biometric template generated from an enrolled body part, wherein the first value and the second value are located at a similar location with respect to the capacitive profile; and
generate an authentication signal based on a difference between the first value and the second value.

2. The biometric authentication apparatus of claim 1, wherein the means for creating the capacitive profile based on the set of raw capacitive frames is configured to combine the set of raw capacitive frames to create a combined capacitive frame comprising a distributed plurality of averaged capacitance levels, each of the averaged capacitive levels being an average of all capacitance levels for a respective location across all raw capacitive frames in the set of capacitive frames.

3. The biometric authentication apparatus of claim 1, wherein the authentication signal indicates a reasonable match has been determined between the capacitive profile and the biometric template.

4. The biometric authentication apparatus of claim 1, wherein the authentication signal identifies the body part as the enrolled body part.

5. The biometric authentication apparatus of claim 1, wherein the sum of the capacitive sensor measurements captured by the row of the capacitive sensor array comprises:
a plurality of capacitive sensor measurements taken along one of a vertical direction or a horizontal direction of the capacitive sensor array.

6. The biometric authentication apparatus of claim 1, wherein the biometric template comprises one or more capacitive profiles, each of the one or more capacitive profiles generated from one or more raw capacitive frames captured by the capacitive sensor system in contact with the enrolled body part.

7. The biometric authentication apparatus of claim 1, wherein each capacitance level of the plurality of capacitance levels comprises a capacitance level sensed by a capacitive sensing element in the capacitive sensor system.

8. The biometric authentication apparatus of claim 1, wherein the capacitive sensor system comprises an arrangement of capacitive sensing elements in a particular shape and the plurality of capacitance levels contained in each raw capacitive frame are arranged in accordance with the particular shape.

9. A biometric security method for a capacitive sensor system, the biometric security method comprising:
capturing a set of raw capacitive frames for a body part via the capacitive sensor system, wherein each raw capacitive frame includes a distribution of a plurality of capacitance levels measured from the body part;
creating a capacitive profile based on the set of raw capacitive frames;
comparing a first value determined from a sum of capacitive sensor measurements captured by a row of a capacitive sensor array to a second value in a biometric template generated from an enrolled body part, wherein the first value and the second value are located at a similar location with respect to the capacitive profile; and
generating an authentication signal based on a difference between the first value and the second value.

10. The biometric security method of claim 9, wherein the creating the capacitive profile based on the set of raw capacitive frames comprises combining the set of raw capacitive frames to create a combined capacitive frame comprising a distributed plurality of averaged capacitance levels, each of the averaged capacitive levels being an average of all capacitance levels for a respective location across all raw capacitive frames in the set of capacitive frames.

11. The biometric security method of claim 9, wherein the authentication signal indicates a reasonable match has been determined between the capacitive profile and the biometric template.

12. The biometric security method of claim 9, wherein the authentication signal identifies the body part as the enrolled body part.

13. The biometric security method of claim 9, wherein the sum of the capacitive sensor measurements captured by the row of the capacitive sensor array comprises a plurality of capacitive sensor measurements taken along one of a vertical direction or a horizontal direction of the capacitive sensor array.

14. The biometric security method of claim 9, wherein the biometric template comprises one or more capacitive profiles, each of the one or more capacitive profiles generated from one or more raw capacitive frames captured by the capacitive sensor system in contact with the enrolled body part.

15. The biometric security method of claim 9, wherein each capacitance level of the plurality of capacitance levels comprises a capacitance level sensed by a capacitive sensing element in the capacitive sensor system.

16. The biometric security method of claim 9, wherein the capacitive sensor system comprises an arrangement of capacitive sensing elements in a particular shape and the plurality of capacitance levels contained in each raw capacitive frame are arranged in accordance with the particular shape.

17. A biometric security apparatus comprising:
a capacitive sensor system configured to capture a set of raw capacitive frames for a body part, wherein each raw capacitive frame includes a distribution of a plurality of capacitance levels measured from the body part; and,
a processor coupled to the capacitive sensor system to receive the set of raw capacitive frames, the processor configured to:
create a capacitive profile based on the set of raw capacitive frames;
compare a first value determined from a sum of capacitive sensor measurements captured by a row of a capacitive sensor array in the capacitive profile to a second value in a biometric template generated from an enrolled body part, wherein the first value and the second value are located at a similar location with respect to the capacitive profile; and
generate an authentication signal based on a difference between the first value and the second value.

18. The biometric security apparatus of claim 17, wherein the processor is further configured to:
combine the set of raw capacitive frames to create a combined capacitive frame comprising a distributed plurality of averaged capacitance levels, each of the averaged capacitive levels being an average of all capacitance levels for a respective location across all raw capacitive frames in the set of capacitive frames.

19. The biometric security apparatus of claim 17, wherein the authentication signal indicates a reasonable match has been determined between the capacitive profile and the biometric template.

20. The biometric security apparatus of claim 17, wherein the authentication signal identifies the body part as the enrolled body part.

21. The biometric security apparatus of claim 17, wherein the sum of the capacitive sensor measurements captured by the row of the capacitive sensor array comprises a plurality of capacitive sensor measurements taken along one of a vertical direction or a horizontal direction of the capacitive sensor array.

22. The biometric security apparatus of claim 17, wherein the biometric template comprises one or more capacitive profiles, each of the one or more capacitive profiles generated from one or more raw capacitive frames captured by the capacitive sensor system in contact with the enrolled body part.

23. The biometric security apparatus of claim 17, wherein each capacitance level of the plurality of capacitance levels comprises a capacitance level sensed by a capacitive sensing element in the capacitive sensor system.

24. The biometric security apparatus of claim 17, wherein the capacitive sensor system comprises an arrangement of capacitive sensing elements in a particular shape and the plurality of capacitance levels contained in each raw capacitive frame are arranged in accordance with the particular shape.

25. A computer program product comprising:
non-transitory computer-readable medium comprising instructions executable by a biometric security system to:
capture a set of raw capacitive frames for a body part via a capacitive sensor system, wherein each raw capacitive frame includes a distribution of a plurality of capacitance levels measured from the body part;
create a capacitive profile based on the set of raw capacitive frames;
compare a first value determined from a sum of capacitive sensor measurements captured by a row of a capacitive sensor array to a second value in a biometric template generated from an enrolled body part, wherein the first value and the second value are located at a similar location with respect to the capacitive profile; and
generate an authentication signal based on a difference between the first value and the second value.

26. The biometric authentication apparatus of claim 1, wherein the capacitive profile comprises a plot of a sum of capacitive sensor measurements captured for each respective row of the capacitive sensor array.

* * * * *